(12) United States Patent
Shukla

(10) Patent No.: US 10,331,787 B2
(45) Date of Patent: Jun. 25, 2019

(54) DISTRIBUTED STORYTELLING FRAMEWORK FOR INTELLIGENCE ANALYSIS

(71) Applicant: Omniscience Corporation, Sunnyvale, CA (US)

(72) Inventor: Manu Shukla, Sterling, VA (US)

(73) Assignee: OMNISCIENCE CORPORATION, Sunnyvale, CA (US)

( * ) Notice: Subject to any disclaimer, the term of this patent is extended or adjusted under 35 U.S.C. 154(b) by 0 days.

(21) Appl. No.: 15/092,020

(22) Filed: Apr. 6, 2016

(65) Prior Publication Data

US 2016/0292151 A1    Oct. 6, 2016

Related U.S. Application Data

(60) Provisional application No. 62/143,540, filed on Apr. 6, 2015.

(51) Int. Cl.
| | | |
|---|---|---|
| G06F 17/27 | (2006.01) | |
| G06F 17/30 | (2006.01) | |
| H04L 12/58 | (2006.01) | |
| G06F 16/34 | (2019.01) | |

(52) U.S. Cl.
CPC ........ *G06F 17/2785* (2013.01); *G06F 16/345* (2019.01); *H04L 51/32* (2013.01)

(58) Field of Classification Search
CPC . G06F 17/30; G06F 17/2785; G06F 17/30719
USPC .......................................................... 704/9
See application file for complete search history.

(56) References Cited

U.S. PATENT DOCUMENTS

| | | | | |
|---|---|---|---|---|
| 7,047,489 | B2* | 5/2006 | Kanno | G06F 16/9562 715/277 |
| 7,644,052 | B1* | 1/2010 | Chang | G06N 5/022 706/45 |
| 2003/0058268 | A1* | 3/2003 | Loui | G06K 9/00711 715/719 |

(Continued)

OTHER PUBLICATIONS

"U.S. Appl. No. 15/253,008, Preliminary Amendment filed Mar. 31, 2017", 6 pgs.

(Continued)

*Primary Examiner* — Richemond Dorvil
*Assistant Examiner* — Rodrigo A Chavez
(74) *Attorney, Agent, or Firm* — Womble Bond Dickinson (US) LLP

(57) ABSTRACT

Aspects of the present disclosure relate to a distributed storytelling framework. A server receives an adjacency list comprising a set of nodes linked together by edges. The server converts the adjacency list to a set of generated storylines, each storyline being represented as a key-value pair. A key represents a first node and a value represents a second node linked to the first node by an edge. The server combines first and second storylines, of the set of generated storylines, to generate an additional storyline in response to a value from a first storyline matching a key from a second storyline. The additional storyline includes a single key and multiple values, and is added to the set of generated storylines. The server repeats combining storylines, of the set of generated storylines, to generate additional storylines. The server provides an output corresponding to at least one of the generated storylines.

17 Claims, 9 Drawing Sheets

(56) References Cited

U.S. PATENT DOCUMENTS

| | | | | | |
|---|---|---|---|---|---|
| 2010/0299364 | A1* | 11/2010 | Baldwin | ............... | G06F 17/279 707/797 |
| 2011/0270889 | A1* | 11/2011 | Stevens | ............... | G06F 16/4393 707/797 |
| 2014/0201244 | A1* | 7/2014 | Zhou | ....................... | G06F 16/00 707/803 |
| 2015/0168162 | A1* | 6/2015 | Subramanian | ......... | G01C 21/28 701/523 |
| 2015/0363402 | A1* | 12/2015 | Jackson | .............. | G06F 16/9535 707/723 |

OTHER PUBLICATIONS

"Information Cartography (Multiple Contributed Articles)", Communications of the ACM, 58(11), (Nov. 2015), 61-73.

"LingPipe: Part-of-Speech Tutorial", Alias, [Online]. Retrieved from the Internet: <URL: http://alias-i.com/lingpipe/demos/tutorial/posTags/read-me.html>, (Accessed: Mar. 7, 2016), 11 pgs.

"PageRank", Wikipedia, [Online]. [Archived Mar. 7, 2016]. Retrieved from the Internet: <URL: https://en.wikipedia.org/wiki/PageRank>, (Accessed: Mar. 7, 2015), 19 pgs.

Austin, David, "How Google Finds Your Needle in the Web's Haystack", Feature Column from the AMS, [Online]. Retrieved from the Internet: <URL: http://www.ams.org/samplings/featurecolumn/fcarcpagerank>, (Accesed: Mar. 7, 2016), 7 pgs.

Dos Santos, Ray, et al., "Spatio-Temporal Storytelling on Twitter", ACM Transactions on Intelligent Systems and Technology, X(X), ZZ:01-ZZ:31

* cited by examiner

DISTRIBUTED STORYTELLING FRAMEWORK FOR INTELLIGENCE ANALYSIS

PRIORITY CLAIM

This application claims priority under 35 U.S.C. § 119 to U.S. Provisional Patent Application Ser. No. 62/143,540, filed Apr. 6, 2015, and titled, "DISTRIBUTED STORYTELLING FRAMEWORK FOR INTELLIGENCE ANALYSIS," which is incorporated herein by reference in its entirety.

TECHNICAL FIELD

The subject matter disclosed herein relates to data analysis and mining. In particular, example embodiments may relate to a distributed storytelling framework for intelligence analysis.

BACKGROUND

Every day, users enter text into publicly accessible social networking or microblogging services describing their activities. This text provides information about ongoing or recent events, some of which may be interesting from various perspectives, such as news reporting or gathering intelligence. Gathering and analyzing intelligence from publicly accessible social networking or microblogging services presents a number of technical challenges.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
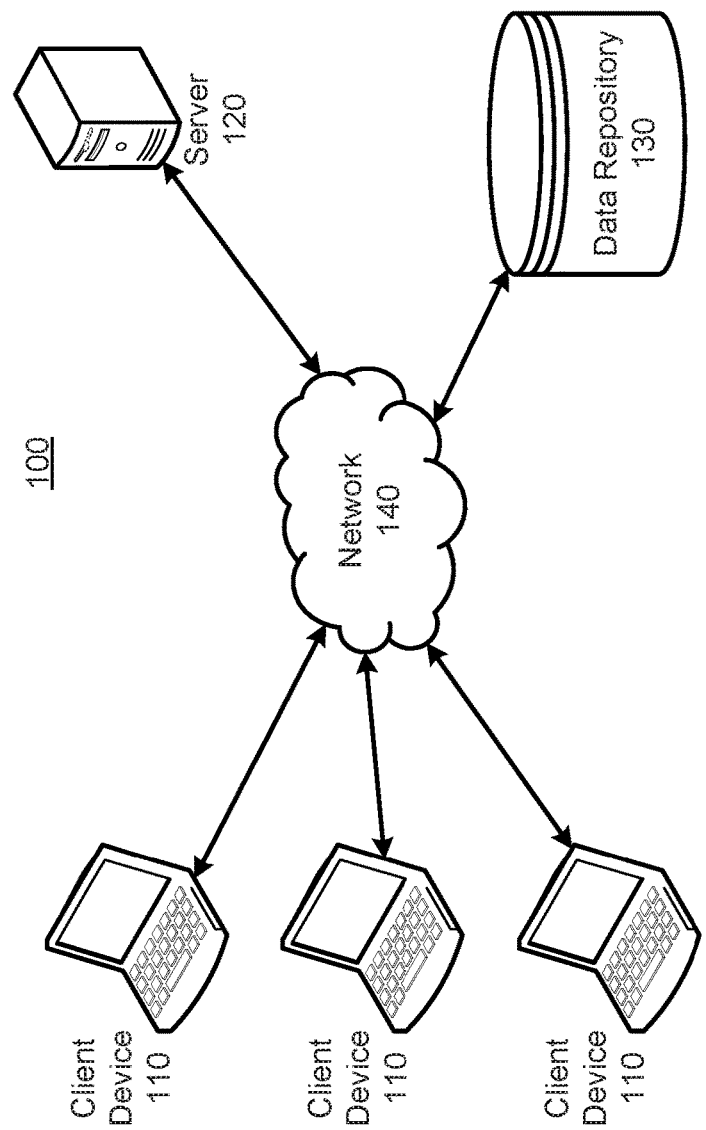
FIG. 1 is a diagram of an example system in which a distributed storytelling framework for intelligence analysis may be implemented.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one aspect, the disclosed subject matter can be embodied in a processor-implemented technical method. The method includes receiving, from a memory associated with a processor, an adjacency list comprising a set of nodes linked together by a set of edges. The method includes, using the processor, converting the adjacency list to a set of generated storylines of length 2, each storyline being represented in the memory as a key-value pair, wherein a key represents a first node and a value represents a second node linked to the first node by an edge. The method includes, using the processor, extending storylines incrementally, by combining storylines of length 2, to generate extended storylines in response to a value from adjacency list by matching an entity from a storyline value, with an entity from an adjacency list value, wherein the extended storyline has a length greater than 2 and includes a single key and multiple values, and is added to the set of generated storylines. The method includes repeating extending storylines, in the set of generated storylines, to generate incrementally longer storylines. The method includes providing an output corresponding to a set of generated storylines of desired length k, where k is an integer greater than 2. The method includes communicating the output as a digital transmission.

In one aspect, the disclosed subject matter can be embodied in a non-transitory computer-readable medium including instructions. The instructions include code for receiving, from a memory associated with processor, an adjacency list comprising a set of nodes linked together by a set of edges. The instructions include code for, using the processor, converting the adjacency list to a set of generated storylines of length 2, each storyline being represented in the memory as a key-value pair, wherein a key represents a first node and a value represents a second node linked to the first node by an edge. The instructions include code for, using the processor, extending the length of each storyline, from the set of generated storylines, to generate an extended storyline in response to a value from a first storyline matching an entity in the value of an adjacency list, wherein the extended storyline has a length greater than 2 and includes a single key and multiple values, and is added to the set of generated storylines. The instructions include code for repeating extending storylines with entities in adjacency lists, of the set of generated storylines, to generate extended storylines. The instructions include code for providing an output corresponding to at least one of the generated storylines. The instructions include code for communicating the output as a digital transmission.

In one aspect, the disclosed subject matter can be embodied in a system. The system includes one or more processors and a memory. The memory includes instructions for execution by the one or more processors. The instructions include code for receiving, from a data repository, an adjacency list comprising a set of nodes linked together by a set of edges. The instructions include code for, using the one or more processors, converting the adjacency list to a set of generated storylines of length 2, each storyline being represented in the data repository as a key-value pair, wherein a key represents a first node and a value represents a second node linked to the first node by an edge. The instructions include code for, using the one or more processors, extending each of the storylines, of the set of generated storylines, to generate an extended set of storyline in response to a value from a first storyline matching a value in an adjacency list representing co-occurrence of the entity with other entities in the value of an adjacency list, wherein the extended storyline has a length greater than 2 and includes a single key and multiple values, and is added to the set of generated storylines. The instructions include code for repeating combining storylines, of the set of generated storylines, to generate additional storylines. The instructions include code for providing an output corresponding to at least one of the generated storylines. The instructions include code for communicating the output as a digital transmission.

As used herein, the term "storyline" encompasses its plain and ordinary meaning. In some examples, a storyline includes a logical connection between entities that corresponds to a natural language phrase, sentence or story.

As noted above, gathering and analyzing data (e.g. intelligence data) from publicly accessible social networking, microblogging services or other platform supporting publication of user generated information (UGI) may present a number of technical challenges. Some embodiments of the subject technology seek to provide solutions for gathering and analyzing such intelligence data.

According to some implementations, a server receives a set of publicly accessible social networking posts, where each post includes text and an associated geographic location. The server converts the posts into an adjacency list having a set of nodes linked together by a set of edges. The server converts the adjacency list into a set of generated storylines of length 2. Each storyline is represented as a key-value pair, where the key represents a first node and the value represents a second node linked to the first node by an edge. The server extends each storyline by combining additional entities from adjacency lists with the second entity of each storyline based on co-occurrence of entities in an adjacency list, of the set of generated storylines, to generate an additional storyline in response to a value from a storyline matching a value from an adjacency list. The extended storyline has a length greater than 2 and includes a single key and multiple values, and is added to the set of generated storylines. The server repeats combining storylines, of the set of generated storylines, to generate increasingly extended storylines till they reach length k, where k is an integer greater than 2. The server provides an output corresponding to at least one of the generated storylines.

As used herein, the term "storyline" encompasses its plain and ordinary meaning. In some examples, a storyline includes a logical connection between entities that corresponds to a natural language phrase, sentence or story. Examples of storylines are described below, for example, in conjunction with FIG. 4.

Storytelling connects entities, such as people, geographic locations, organizations and any other noun, to establish meaningful storylines among them. Storylines may be used in spatio-temporal storytelling that incorporates spatial, temporal, and graph computations to enhance coherence and meaning. However, when performed sequentially, these computations become a bottleneck because the massive number of entities make space and time complexity untenable. Some aspects of the subject technology relate to distributed spatio-temporal concept search-based storytelling. Such storytelling may include a distributed framework for performing spatio-temporal storytelling. The framework, in some implementations, extracts entities from microblogs and event data, and links these entities using a concept search to derive storylines in a distributed fashion. Performing these operations at scale allows deeper and broader analysis of storylines. Some aspects of the subject technology extend concept graphing and concept rank techniques and parallelize them in a distributed key-value pair paradigm. The parallelization technique speeds up the generation and filtering of storylines on massive datasets.

FIG. 1 is a diagram of an example system 100 in which a distributed storytelling framework for intelligence analysis may be implemented. As shown, the system 100 includes client device(s) 110, a server 120, and a data repository 130 connected to one another via a network 140. The network 140 may include one or more of the Internet, an intranet, a local area network, a wide area network (WAN), a cellular network, a WiFi network, a virtual private network (VPN), a public network, a wired network, a wireless network, etc.

The client device(s) 110 may include one or more of a laptop computer, a desktop computer, a mobile phone, a tablet computer, a personal digital assistant (PDA), a digital music player, etc. The client device(s) 110 may include an application (or multiple applications), such as a web browser or a special purpose application, for communicating with the server 120 and the data repository 130. Using the application, a user of the client device(s) 110 may add a post to a social networking service or to a microblog. Using the application, the user of the client device(s) 110 may request an output corresponding to a storyline generated by the server using the techniques described herein.

The server 120 stores data or instructions. The server 120 is programmed to analyze intelligence from content associated with a social networking service or microblogging service, which may be stored in the data repository 130. More details of the operation of the server 120 are provided in conjunction with FIG. 2 and FIG. 3.

The data repository 130 stores content associated with a social networking service or a microblog, such as posts, which may include text and may be associated with a geographic location. The data repository 130 also stores an adjacency list, which the server 120 generates from the posts, as described, for example, in conjunction with FIG. 2 and FIG. 3.

In the implementation of FIG. 1, the system 100 includes a single data repository 130 and a single server 120. However, the subject technology may be implemented with multiple data repositories 130 or multiple servers 120. Furthermore, as shown in FIG. 1, a single network 140 connects the client device(s) 110, the server 120, and the data repository 130. However, the subject technology may be implemented using multiple networks 140 to connect the machines. Additionally, while the server 120 and the data repository 130 are illustrated as being distinct machines, in some examples, a single machine functions as both the server 120 and the data repository 130. Furthermore, FIG. 1 illustrates three client devices 110. However, the system 100 may include any number of client devices 110 connected to the network 140. In some cases, the system 100 may include thousands or millions of client devices 110.

Figure 2:
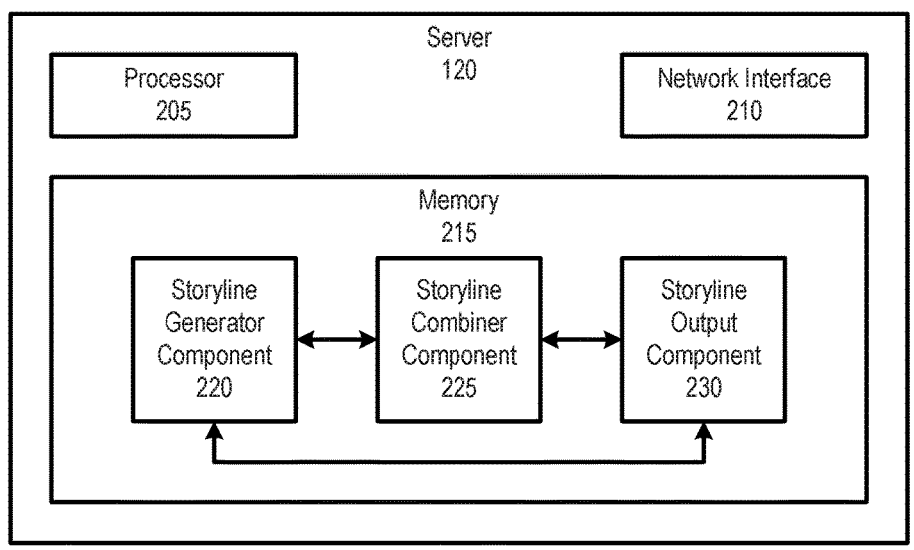
FIG. 2 is a block diagram of an example of the server of FIG. 1.

FIG. 2 is a block diagram of an example of the server 120 of FIG. 1. As shown, the server 120 includes a processor 205, a network interface 210, and a memory 215. The processor 205 executes machine instructions, which may be stored in the memory 215. While a single processor 205 is illustrated, the server 120 may include multiple processors arranged into multiple processing units (e.g., central processing unit (CPU), graphics processing unit (GPU), etc.). The processor 205 includes one or more processors. The network interface 210 allows the server 120 to send and receive data via the network 140. The network interface 210 includes one or more network interface cards (NICs). The memory 215 stores data or instructions. As shown, the memory 215 includes a storyline generator component 220, a storyline combiner component 225, and a storyline output component 230.

The storyline generator component 220 is configured to receive, from the data repository 130, an adjacency list including a set of nodes linked together by a set of edges. Upon receiving the adjacency list, the storyline generator component 220 is configured to convert the adjacency list to a set of generated storylines of length 2. The set of generated storylines are stored in the data repository 130. Each storyline is represented as a key-value pair, where the key represents a first node and the value represents a second node linked to the first node by an edge.

The storyline combiner component 225 is configured to combine first and second storylines, of the set of generated storylines, to generate an additional storyline in response to a value from a first storyline matching a key from a second storyline. The additional storyline has a length greater than 2 and includes a single key and multiple values. The additional storyline is added to the set of generated storylines stored in the data repository 130. The storyline combiner component 225 is configured to repeat combining storylines of the set of generated storylines with co-occurring entities in adjacency lists to generate extended storylines. The generated additional storylines are added to the set of generated storylines stored in the data repository 130.

The storyline output component 230 is configured to provide, to a client device 110, an output corresponding to at least one of the generated storylines. The output may be provided in response to a query, received from a client device 110, for a storyline. For example, the client device 110 may provide, to the storyline output component 230, a starting entity for storylines related to the query "coffee." In response, the storyline output component 230 is configured to provide an output of one or more storylines that include "coffee."

As used herein, the term "configured" encompasses its plain and ordinary meaning. A component (e.g., component 220, 225, or 230) may be configured to carry out operation(s) by storing code for the operation(s) in memory (e.g., memory 215). Processing hardware (e.g., processor 205) may carry out the operations by accessing the appropriate locations in the memory 215. Alternatively, the module may be configured to carry out the operation(s) by having the operation(s) hard-wired in the processing hardware.

As shown, the components 220, 225, and 230 are located within the memory 215. The components 220, 225, and 230 may be implemented as all software, all hardware, or a combination of software and hardware. In some cases, the one or more of components 220, 225, and 230 may be hard-wired into the processor 205 instead of residing within the memory 215. One or more of the modules 220, 225, and 230 may be implemented as an application-specific integrated circuit (ASIC), a field-programmable gate array (FPGA), or any other electrical circuit, which resides inside or outside the memory 215 or inside or outside the processor 205. The components 220, 225, and 230 may correspond to any known software or hardware components, in addition to the examples described herein.

As shown, the components 220, 225, and 230 are all communicatively coupled to exchange data with one another. In some examples, the component 220 provides its output to the component 225, and the component 225 provides its output to the component 230.

Figure 3:
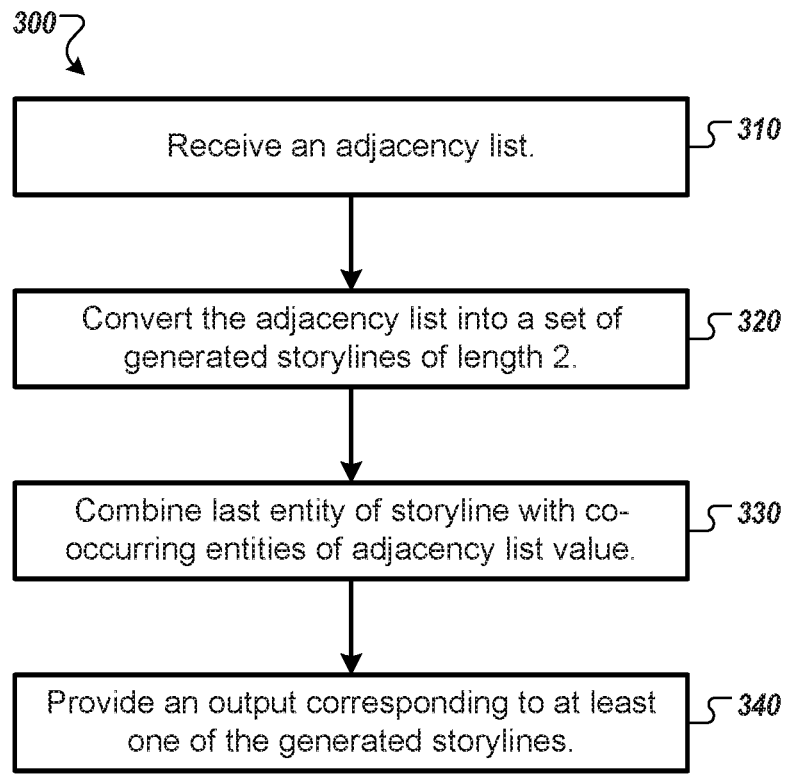
FIG. 3 is a flowchart illustrating a method for distributed storytelling framework for intelligence analysis.

FIG. 3 is a flowchart illustrating a method 300 for distributed storytelling framework for intelligence analysis. The method 300 may be implemented at the server 120.

The method 300 begins at operation 310, where the server 120 receives an adjacency list including a set of nodes linked together by a set of edges. According to one example, the server 120 may access multiple posts from social networking service(s) or microblogging service(s), where each post is associated with text and a geographic location. The server 120 converts the posts into the adjacency list having the set of nodes linked together by the set of edges. According to some examples, posts may be converted into an adjacency list by identifying the parts of speech in the post and creating an adjacency list from the extracted parts of speech in the post.

Any known natural language processing techniques may be used, for example, as described in Chris Manning and Hinrich Schuetze, 1999, *Foundations of Statistical Natural Language Processing*, MIT Press, and Dan Jurafsky and James H. Martin, 2000, *Speech and Language Processing*, Prentice Hall, the entire content of each of which is incorporated herein by reference. One technique for identifying parts of speech is described in LingPipe, "Parts of Speech Tutorial," alias-i.com/lingpipe/demos/tutorial/posTags/read-me.html, last accessed 7 Mar. 2016, the entire content of which is incorporated herein by reference. Speech recognition techniques are also described in Larry Rabiner and Fred Juang, 1993, *Fundamentals of Speech Recognition*, Prentice Hall, and Fred Jelinek, 1998, *Statistical Methods for Speech Recognition*. MIT Press, the entire content of each of which is incorporated herein by reference.

A post may be associated with a geographic location using different techniques. In one example, a post may be created on a device having access to a global positioning system (GPS) or other system for determining a geographic location (e.g., cellular triangulation, Internet Protocol (IP) address, determination based on accessible WiFi networks, etc.). The device may add a geographic tag to the post identifying the geographic location. Alternatively, the post may mention a geographic location in its text. For example, a post that says, "I am watching the baseball game at Fenway Park," was likely written at Fenway Park in Boston, Mass. Furthermore, other posts made by the same user at or near the same time (e.g., within one hour, one day, etc.) are likely to also be made at or near Fenway Park. In another alternative, the post may be associated with a default geographic location of a person making the post. For example, a post from someone who lives or works in San Francisco was likely written in or near San Francisco.

At operation 320, the server 120 converts the adjacency list into a set of generated storylines of length 2. Each storyline is represented as a key-value pair, where the key represents a first node and the value represents a second node linked by an edge to the first node. According to one example, the adjacency list may be grouped into clusters based on its nodes and edges, and nodes and edges within a cluster may be connected together to build "metro maps," as described in detail by Dafna Shahaf, Carlos Guestrin, Eric Horvitz, and Jure Leskovec in "Information Cartography," available at cs.stanford.edu/people/jure/pubs/cartographycacm15.pdf, last visited 7 Mar. 2016, the entire content of which is incorporated herein by reference.

At operation 330, the server 120 combines the last entity from a storyline (or multiple storylines) with co-occurring entities of an adjacency list value (or multiple adjacency list values). The additional storyline that is created by the combining operation 330 has a length greater than 2 and includes a single key and multiple values. The additional storyline is added to the set of generated storylines. The server 120 repeats combining storylines and co-occurring entities, in this manner, to generate additional storylines. In one example, a key-value pair of the first storyline is N1:N2 and a combination in an adjacency list value is N2:N3. The extended storyline, generated from the first storyline and the adjacency list in which N2 co-occurs with N3, is N1:N2:N3. According to some examples, the server 120 may combine a storyline with co-occurring entities if a timestamp of the co-occurring entities is later than a timestamp of the storyline, to ensure that all generated storylines have a chronological order. According to some examples, the storyline may be combined with the co-occurring entities in response to the storyline and the entities having a common node in an adjacency list with their geographic locations within a threshold distance (e.g., 10 kilometers, 100 kilometers, 200 kilometers, etc.) of one another. For example, a microblog post, "Pink car runs stop sign," and "Pink car is pulled over by police officer," are likely to relate to the same pink car if both microblog posts were made within 10 minutes and within 10 kilometers of one another, but are not likely to relate to the same car if they were made several days apart or if one was made in Phoenix, Ariz. and the other was made in Miami, Fla.

At operation 340, the server 120 provides an output corresponding to at least one of the generated storylines. The output may be provided to a client device 110 in response to a query from the client device 110. In some cases, the output is communicated, from the server 120 to the client device 110, as a digital transmission.

According to some examples, each node may be associated with a concept rank, which measures an importance of the node based on a number of other nodes linking to the node. The output may be provided based, in part, on the concept ranks of the nodes in the generated storylines. For example, in response to the query for "watermelon," the storyline that includes "watermelon" and has a highest concept rank (among its nodes) may be provided first. The storyline that has the second highest concept rank may be provided second, etc. The concept rank for a node that includes links may be computed similarly to how a page rank is computed for a webpage that includes links by the PageRank algorithm developed by Google Corporation in Mountain View, Calif. See, generally, David Austin, "How Google Finds Your Needle in the Web's Haystack," www.ams.org/samplings/feature-column/fcarc-pagerank, last visited 7 Mar. 2016, and Wikipedia: PageRank, en.wikipedia.org/wiki/PageRank, last visited 7 Mar. 2016, the entire content of each of which is incorporated herein by reference. Alternatively, any other measure of importance of a node may be used in place of the concept rank or page rank. After operation 340, the method 300 ends.

In some cases, during implementation of the method 300, the server 120 incrementally extends storylines from 2 to 3 to 4 in length by adding entities from the adjacency list that co-occur with last entity of partial storylines, rather than combining storylines. In some cases, the concept rank technique is used to sort storylines by the concept rank of the entities after the storylines are built.

In some cases, events (e.g., terrorist attacks, demonstrations, riots, strikes, etc.) explode on social media long before the events are picked up by traditional media. Social networking services, such as Twitter® of San Francisco, Calif., have many users that post information about events as the users observe the events. Aspects of the subject technology include using computer(s) to learn about events based on posts in social networking services.

As used herein, the term "storytelling" encompasses its plain and ordinary meaning. In some cases, storytelling may refer to a process of connecting entities through their characteristics, actions, and events. In one historical example, when the Boston Marathon bombings of Apr. 15, 2013, occurred, many storylines were developed on Twitter® describing the events. For instance, several people were detained near the blast spots, the residence of a Saudi national was searched, MIT police officer S. Collier was killed, and the Tsarnaev brothers were identified as the suspects. All of these developments could be observed by accessing the right posts on TWITTER®. However, finding the posts was impractical due to the immense volume of data. One technical problem is that automatically putting all of these facts together by machine becomes computationally intensive and constrained by slow performance when performed in traditional sequential processing. Thus, storytelling may fall within the field of exploratory analysis, which is useful in intelligence, law enforcement, and other endeavors, where detecting faint events are key to stopping rogue activities.

The subject technology, in some aspects, provides for performing storytelling in a distributed environment that is scalable under increasing volumes of data. Storylines may be generated according to the scheme disclosed in Santos, R. D., et al., 2013, Spatio-temporal Storytelling on Twitter, Computer Science Technical Reports, Virginia Tech, available at: vtechworks.lib.vt.edu/handle/10919/24701, last visited 8 Mar. 2016 (hereinafter "Santos"), the entire content of which is incorporated herein by reference. The scheme of Santos generates a graph of entities, a concept graph, and performs ranking on the entities using concept rank, a variant of the page rank algorithm developed by Google Corporation of Mountain View, Calif., to decide which entities to connect in the concept graph. However, the scheme of Santos does not scale to large data sets and uses a large number of operation such as distance calculations.

Another technical challenge in storytelling is relationship building, which is deciding how to link entities based on interactions between them. This challenge arises because there are countless ways of connecting entities—based on mention in the same document or post, based on geographic proximity, based on shared characteristics, based on observations of communication between the entities, etc. For various applications, some of the above may be important while others may be irrelevant. From a computational perspective, differentiating between the above may be challenging unless a very specific application of technology is targeted. Thus, aspects of the subject technology may include connecting all entities in temporal order to construct all possible storylines. However, this presents a technical problem of scaling after exhaustively connecting all or a portion of the entities based on determined relationships between them. One solution for this problem is to apply distributed processing in order to introspect as many different types of entities and connections as possible, and to generate different storylines based on all of these different entities and connections. In this manner, a human or machine analyst, not the computational algorithm, may decide which entity interactions are important and which are not.

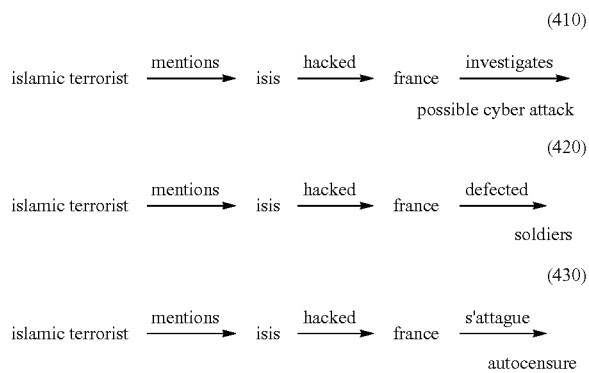

Figure 4:
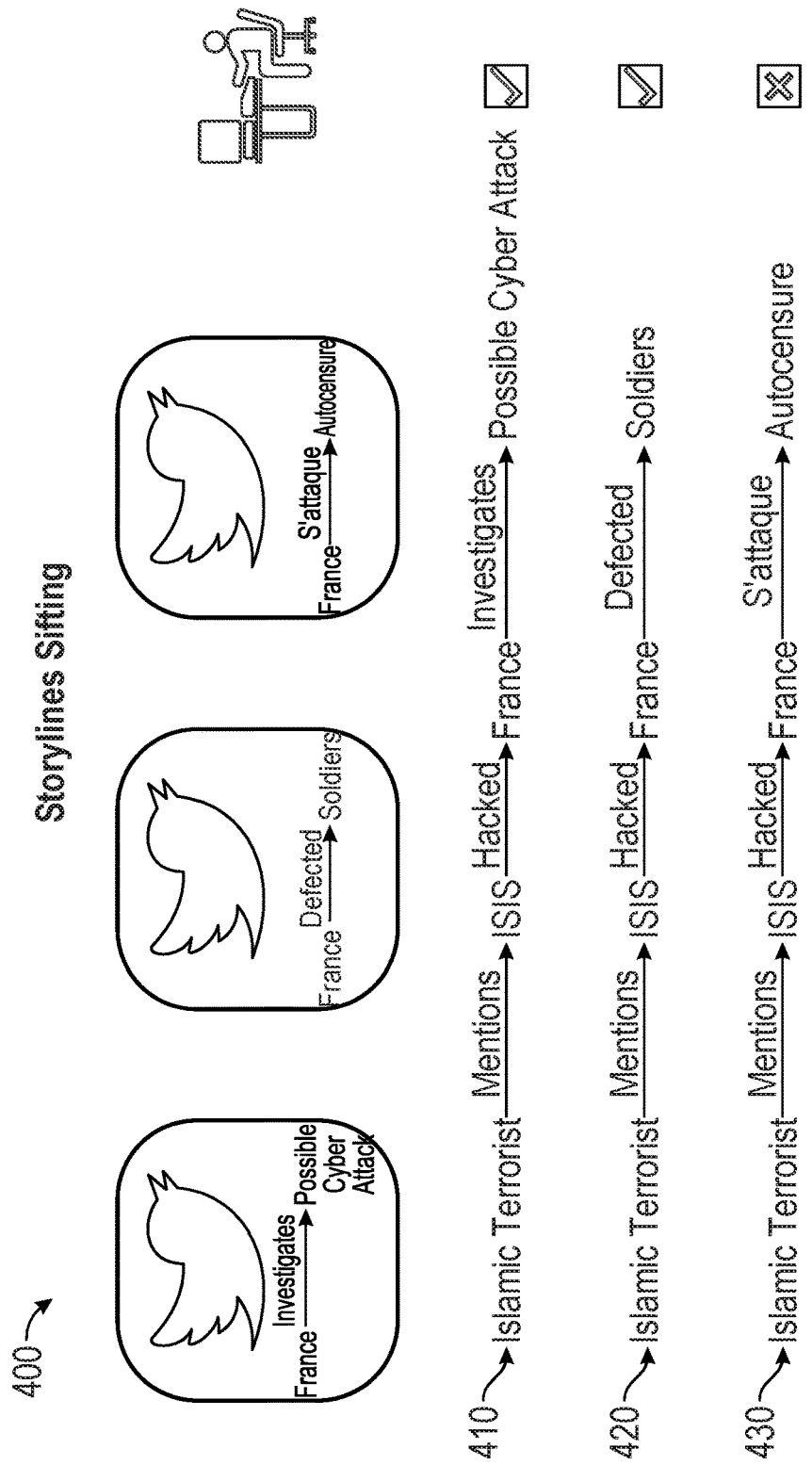
FIG. 4 is a schematic diagram illustrating an example set of storylines generated from posts.

FIG. 4 illustrates a set of storylines 400 generated from posts in Twitter® (hereinafter "tweets") regarding the *Charlie Hebdo* attacks in Paris in January 2015. The storylines are copied above. In the examples of FIG. 4, an investigator may be interested in storylines 410 and 420, as they appear related to cyber and military attacks. Storyline 430, on the other hand, is obtained from tweets related to journalism and, hence, is of less pressing concern to the investigator (but possibly more relevant in other use cases). Tweets or posts from other services can be used to generate millions of possible storylines. Distributed storytelling, as implemented in conjunction with some aspects of the subject technology, allows some of these connections to be presented and analyzed.

A comprehensive presentation of such interactions is useful not only for completeness (for example, finding lethal activities that may follow terrorist attacks), but also for timeliness (for example, preventing the acts from occurring). The examples of FIG. 4 illustrate the need for distributed and parallelized computations, which can enable storytelling with high accuracy and relevance in the presence of massive amounts of data.

To perform these tasks at a scale where millions of microblog posts are processed creates a number of issues. A first challenge is distributing the sequence of operations in storyline creation. In some examples, storytelling implements several operations, including geo-coding locations, extracting entities and relationships from text, and binding entities. In order to perform these operations on millions of social networking or microblog posts (e.g., tweets) the pieces may be glued together across multiple distributed jobs. A second challenge is scaling graph algorithms utilized in storylines generation. Calculating, ranking, and generating storylines using graphs is inherently hard to distribute. Given the large number of edges and nodes associated with large datasets, the ability to distribute the process in order to scale to millions of entities is useful. A third challenge is distributed geo-coding and associating locations with entities in storylines. Finding locations from a post can result in a large number of redundant geocoding requests, causing performance bottlenecks. Combining geocoded locations with storyline generation is sometimes useful in scaling. A fourth challenge is deeper analysis techniques that allow analysts to focus on individual sections of large numbers of storylines. The subject technology, in some cases, finds storylines that are relevant beyond pure ranking and pushes their relevance higher to allow analysts to search through them. Implementation of such techniques is useful to be able to fully benefit from the large number of storylines generated by distributed methods.

Performing storytelling at scale can be achieved using several approaches. Some frameworks distribute mining horizontally based on key-value pairs. Aspects of the subject technology model the storytelling process in key-value pairs and then implement it using the popular and widely available MapReduce paradigm. A distributed framework is presented as a means to generate storylines using spatio-temporal techniques on short, ill-formed text found in the data of a social network or microblog, such as Twitter®. Connecting entities across structured events and not just microblog posts generates useful storylines. As with the ConceptGraph-based approach presented in Santos, one approach to obtaining coherent storylines is to identify regions of spatial propagation where related entities cluster. Another approach includes creating an exhaustive list of storylines and allowing analysts to sift through them as needed to discover ones that are emerging. The subject technology, according to some aspects, uses big data tools available on the cloud that provide key-value pair based distribution to perform these tasks at scale. The scaling is horizontal in that as increasing amounts of data are processed, the scaling can be performed almost indefinitely by increasing the number of nodes in the cluster. The scaling is horizontal in computing processes along with memory and storage for microblog texts and the storylines generated from them. The performance of each node is comparable to the performance of single node storytelling. However, the horizontal scalability of the key-value pair distribution paradigm allows, in some cases, for indefinite scalability.

One concept of the subject technology is using distributed computing techniques to create and analyze storylines at scale. Extracting entities from posts, computing ConceptRank and generating storylines in parallel allows the storylines to be created at a large scale. Distribution algorithms and techniques such as inverted value join (described in detail below) are used to perform the computations that are presented below.

One concept of the subject technology is using ConceptGraph traversal to generate storylines. Distributed storyline generation includes traversing ConceptGraph, which is a graph of entities. A traversal technique, ConceptSearch, is presented that performs distributed forward and bi-direction graph search to generate storylines from the directed ConceptGraph.

One concept of the subject technology is using analysis through spatial filtering with the evaluated storylines. The approach with iterative ConceptSearch produces storylines for multiple starting points for evaluation by analysts with little incremental computation cost for each additional starting point. Filtering on entity network distances allows analysts to focus on a smaller set of storylines.

As used herein, "storytelling" may refer to its plain and ordinary meaning or to the process of modeling storylines from search results, and linking documents entities into stories. Storytelling may attempt to link disparate entities that are known ahead of time, such as the connections between two individuals. Storytelling may include traditional text analysis, and spatio-temporal entity analysis. ConceptRank-based storytelling, as well as forecasting events based on spatio-temporal storytelling, are explored in Santos. Storytelling can also include linking entities across documents, using named entity extraction techniques, and leveraging knowledge bases to extract entities. Link analysis algorithms often rely on graphs as a modeling abstraction.

Connecting the terms to form storylines is one approach to storytelling. Users can be associated with other users through social network posts, for example, based on connections in the social network. One aspect of the subject technology is an algorithm to perform ConceptRank computations over ConceptGraphs in parallel.

Distributed storytelling is useful for massive datasets (e.g., Twitter®), along with other sources of social media data. To process the datasets, scalable joins can be used. Data joins can be distributed across multiple sources using key value pairs.

Figure 5:
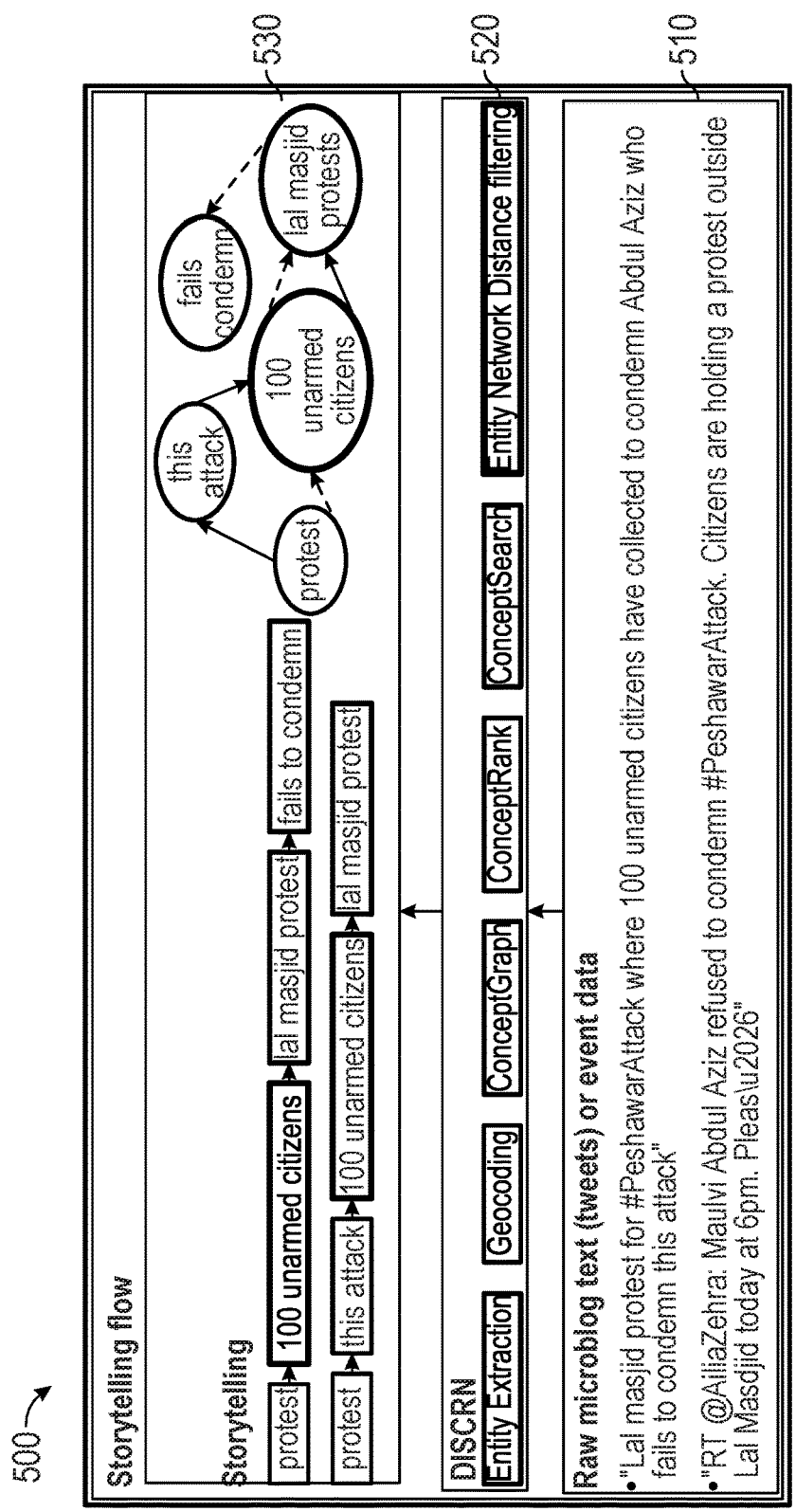
FIG. 5 is a schematic diagram illustrating an example flow for generating storylines.

FIG. 5 illustrates a flow 500 for generating storylines. As shown in the flow 500, in block 510, microblog text (e.g., tweets) is received as input. In block 520, entity extraction, geo-coding, concept graph, concept rank, concept search, and entity network and distance filtering are applied to the microblog text. In block 530, stories are extracted using the applications of block 520.

Briefly, storytelling involves six key tasks: extraction of entities, geo-coding locations, building a graph of entities and relationships, ranking, traversing the graph to generate storylines, and storyline filtering based on entity distances.

According to one configuration, a master node in the cluster orchestrates data storage and computation distribution over multiple slave nodes. MapReduce allows the master node to break down computation tasks into mappers and reducers and distributes tasks over slave nodes. Files are uploaded into distributed file storage, split into blocks and then processed in MapReduce. A master node keeps track of all the blocks of a file and where they are stored. Mappers and Reducers work on file blocks on slave nodes exploiting co-location of computation with data. Mappers read in input data as key value pairs $<k_1, v_1>$ and emit intermediate key value pairs $<k_2, v_2>$; reducers receive the intermediate key value pairs grouped by $k_2$ and process them to generate the final set of key value pairs $<k_3, v_3>$. The keys $k_2$ are sorted and partitioners determine which reducer handles a particular key-value pair.

Key-value pair-based parallelization allows data records to be split into elements that can be operated upon independently in parallel with other records on multiple nodes of a cluster. The challenge then becomes to associate all the sub-elements needed to perform an operation to generate a result element that represents the value of the key-value pair and emit it with a key that uniquely identifies that operation. The operation then generates a single result value which, in combination with other result values, will form the result set needed from the input data. If a result set $r_i$ from an input set $e_i$ is needed, then, according to the key-value pair-based paradigm, each input record $e_i$ may be emitted as a key value pair $<k,v>$. All the elements needed to generate a result value $r_i$ from $e_i$ will be in the emitted value $v_i$, with the key $k_i$ being unique so as to distribute pairs across nodes without collisions. In some operations, it is not feasible to build the key-value pair to convert an input value to a result value in a single operation. In these operations, a series of key-value pair emissions may be performed and sub-processing or aggregating the elements in the value may be continued until a state is achieved where the machine can perform the final operation to emit the result value. In simple cases, this is similar to a multi-key join, where multiple inputs combine to create a single value in order to perform an operation. In some cases, however, complex computations are performed to bring the intermediate values to a state that can generate a final result value.

Figure 6:
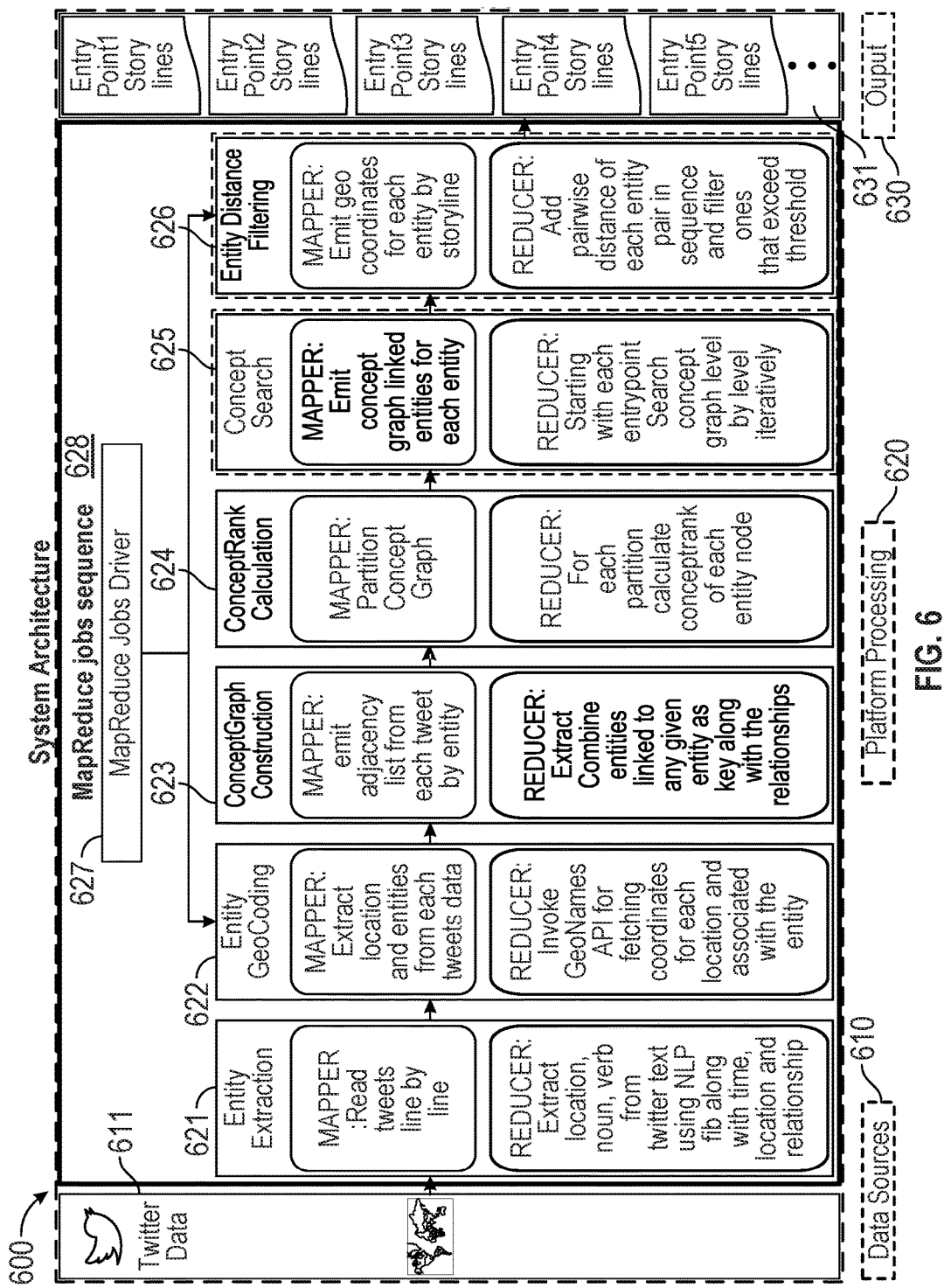
FIG. 6 is a schematic diagram illustrating an example system architecture in which aspects of the subject technology can be implemented.

FIG. 6 illustrates an example system architecture 600 in which aspects of the subject technology can be implemented. As shown in FIG. 6, data sources 610 (including Twitter® data 611) are provided to platform processing 620, which generates an output 630 (including storylines 631).

The platform processing 620 implements the six key MapReduce jobs (entity extraction 621, entity geo-coding 622, ConceptGraph construction 623, ConceptRank calculation 624, ConceptSearch 625, and entity distance filtering 626) that are run in sequence to generate storylines. The MapReduce jobs driver 627 calls each job in according to the MapReduce jobs sequence 628, with the output of a job becoming the input to the next job. Operations outlined with dotted lines (ConceptSearch 625 and entity distance filtering 626) indicate multiple jobs. However, the number of MapReduce jobs is, in some cases, bounded and small enough to avoid disk input/output becoming a major issue as each subset of inputs is being read on a separate cluster node. At a high level, the blocks 621-626 include functions for: extracting the entities and their relationships from the raw data (for example, "Tsarnaev", "Boston Marathon", "FBI"), identifying and geocoding their locations (for example, "Boston, lat/lon=42.3601,71.0589"), building a graph using the entities as nodes and relationships as edges (for example, "FBI→investigating TSARNAEV→seen at→Boston Marathon"), computing ConceptRank for each node (for example, "TSARNAEV=3.05, FBI=0.94, Boston Marathon=5.17"), building storylines and filtering with entities closest in space (for example, "Boston Marathon attacked by TSARNAEV arrested by FBI"). Distance-based filtering can be turned off if not needed by the analyst. The number of MapReduce jobs stays constant for storylines of a certain length in some aspects of the subject technology. The data written to disk is generally a subset of the input data sources 610 (e.g., Twitter® data 611). The larger the number of jobs, the more times the disk is hit. However, this is a less significant expense as some data is generated for specific reasons, such as the geo-coordinates of entities, which is later joined with other datasets such as entities in storylines to perform entity network distance-based filtering or combining storylines with the ConceptRank of entities. These are used for sorting and filtering storylines, in some implementations.

Figure 7:
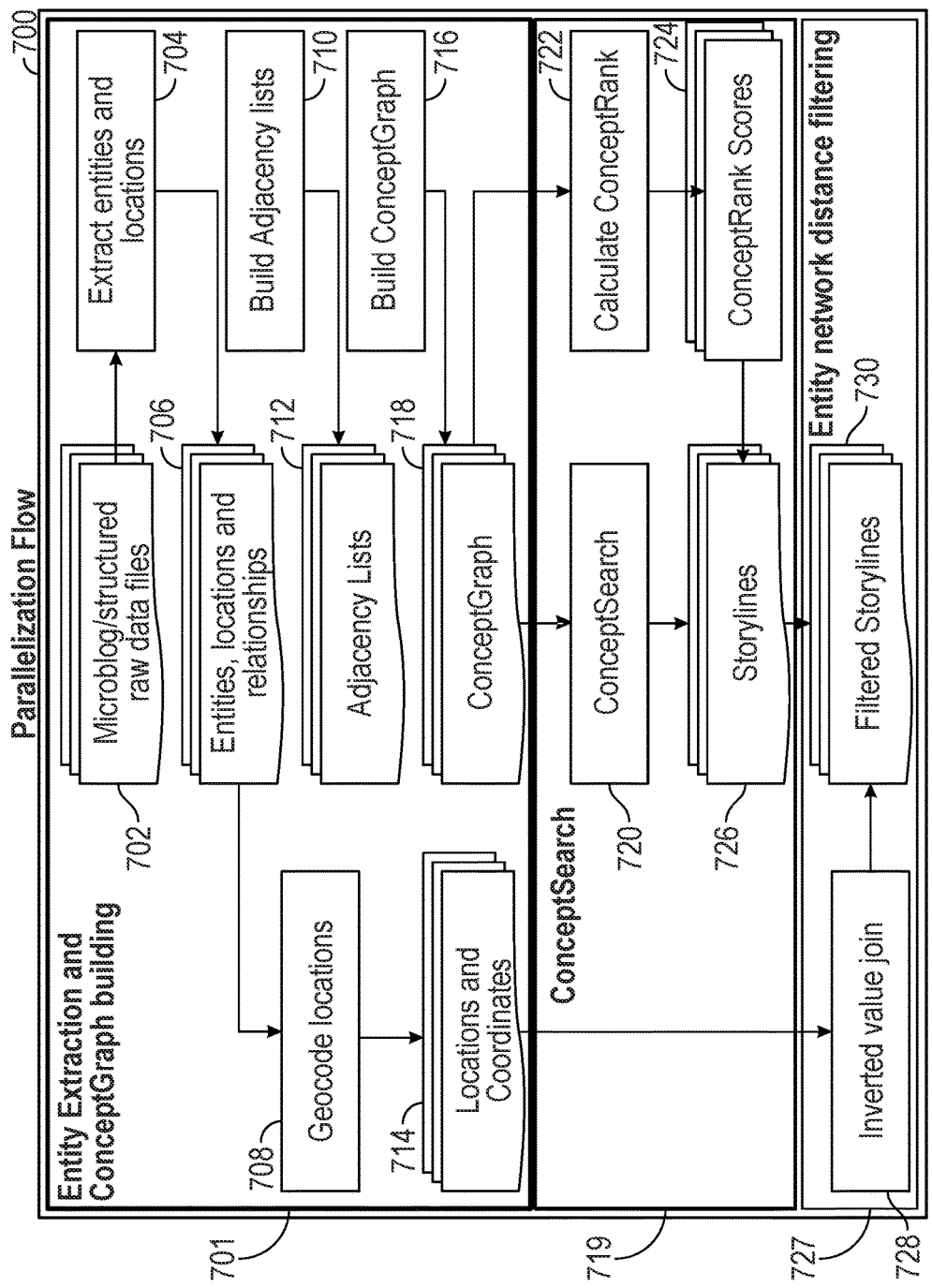
FIG. 7 is a flow diagram illustrating an example parallelization flow for building a storyline.

FIG. 7 illustrates an example parallelization flow 700 for building a storyline. The flow 700 begins at block 702, where microblog or structured raw data files are receives. At 704, entities and locations are extracted from the microblog or structured raw data files. At 706, entities, locations and relationships are identified from the microblog or structured raw data files. At block 708, geocoded locations are identified. At 714, locations and coordinates are extracted from the identified geocoded locations.

At 710, adjacency lists are built. At 712 the built adjacency lists are extracted. At 716 a concept graph is built. At 718, the built concept graph is extracted.

At 720, concept search is applied, and at 722, the concept rank is calculated. At 724, the concept rank scores are calculated. At 726, the storylines are extracted.

At 728, inverted value join is applied to the locations and coordinates of 714. At 730, the filtered storyline are extracted.

The flow 700 can be broken up into three parts. The "entity extraction and concept graph building" component 701 includes blocks 702-718. The concept search component 719 includes blocks 720-726. The "entity network distance filtering" component 727 includes blocks 728-730.

The component 701 describes how distributed entity extraction and geocoding are performed in parallel on each cluster node to create adjacency lists, and then geocode locations to associate each entity with its coordinates. Geocoding includes determining geographic locations of posts. In some examples, the geographic locations of multiple posts may be fetched in parallel. The geocoded locations are used, for example, in entity network distance computations. The adjacency lists from each post are consolidated into a ConceptGraph. This graph is then used to calculate ConceptRank.

The concept search component 719 computes ConceptRank in parallel from ConceptGraph. Once ConceptRank has been calculated, storylines can finally be generated: the algorithm iterates over ConceptGraph with set number of starting entities to build storylines of length k entities (which can be specified by the user). ConceptSearch is called iteratively such that at the end of each iteration the length of the candidate storylines is incremented by 1 until storylines of length k are output. ConceptGraph traversal can be done both in the forward direction following outgoing links and in a bi-directional pattern by following both outgoing and incoming links.

The component 727 uses an inverted value join to combine the locations and entities of storylines. Together they allow for filtering of storylines whose entity pair distance sum exceeds a user specified threshold. The joins are performed such that there is no need to build large memory structures at any stage to ensure full scalability. Entity network distance-based filtering can be skipped and storylines will still be generated without the filtering.

---

Algorithm 1 Extract entities, geocode locations and build ConceptGraph

1: MapReduce1:
2: Mapper1:
   Input:$<k_1, v_1> \rightarrow <offset_i, content_i>$
3: Parse $content_i$, and extract $\{e_i : r_i\}$ // using nlp parser and classifier
   Output$<k_1', v_1'> \rightarrow <tweetid_i, e_1:r_2; e_2:r_2; \ldots; loc_i; t_i>$
4: Reducer1: {I}dentity reducer
   Input: $<k_1', v_1'> \rightarrow <tweetid_i, e_1:r_2; e_2:r_2; \ldots; loc_i; t_i>$
5: parse tweet //simply output the tweetid and the entities, relationships, locations, timestamp,...
   Output: $<k_1', v_1'> \rightarrow <tweetid_i, e_1:r_2; e_2:r_2; \ldots; loc_i; t_i>$
6: MapReduce2:
7: Mapper2:
   Input:$<k_1; v_1> \rightarrow <tweetid_i, e_1:r_1; e_2:r_2; \ldots; loc_i; t_i>$
8: emit each entity $e_j$ in tweet by location $loc_i$ // assume each entity in tweet has same location
   Output: $<k_1', v_1'> \rightarrow <loc_i, e_1:e_2: \ldots :e_n>$
9: Reducer2:
   Input: $<k_1', v_1'> \rightarrow <loc_i, e_1:e_2: \ldots :e_n; \ldots :e_s>$
10: Geocode $loc_i$ to $coord_i$ using geonames api // api is called for each location once saving compute and money
    Output:$<k_1', v_1'> \rightarrow <e_1, loc_i:coord_i>$
        $<e_2, loc_i:coord_i>$
        ....
        $<e_s, loc_i:coord_i>$
11: MapReduce3:
12: Mapper3:
    Input:$<k_1; v_1> \rightarrow <tweetid_i, e_a:r_a; e_b:r_b; \ldots>$
        $<e_j, e_c:r_c; e_d:r_d \ldots>$
13: Separate and emit each entity pair $\{e_i\ e_a : r_a\}$ from adj list
    Output$<k_1', v_1'> \rightarrow <e_i, e_a:r_a>$
        $<e_i, e_b:r_b>$
        $<e_i, e_c:r_c>$
        ...
14: Reducer3:
    Input:$<k_1; v_1> \rightarrow <e_i, e_a:r_a>$
15: Combine adjacency lists entities $e_i, \{e_a:r_a \ldots\}$ into ConceptGraph // each entity can have multiple values that need to be iterated over and combined
    Output: $<k_1', v_1'> \rightarrow <e_i, e_a:r_a; e_b:r_b; e_c:r_c \ldots>$

---

Algorithm 1 describes some implementations of the three MapReduce jobs used to perform entity extraction, geocoding of locations and building ConceptGraph from raw microblogs input. The first operation in building storylines is to extract the entities and modeling that process as key-value pairs in MapReduce1. Parsing text and extracting entities is shown in line 3. Here, $e_i:r_i$ are the entity and relationships extracted from the input text of the microblog (content) as noun and preceding verb, $loc_i$ is the location of post and $t_i$ the time. This operation builds adjacency lists from the extracted entities where the first entity has links to all the subsequent entities. The second operation is geocoding each location from the microblog entry. This process is modeled as key-value pairs in MapReduce2 as shown in line 10. The third operation is consolidating the adjacency lists into ConceptGraph nodes. Modeling this process as key-value pairs includes implementing, in some cases, aggregating the values of a key representing an entity in MapReduce3 in the algorithm. Here, $e_j$ is the starting entity in a tweet and $e_c:r_c$; $e_d:r_d$ . . . are the subsequent entities and relationships extracted from it. A MapReduce reducer combines entity $e_j$ from multiple tweets and its corresponding following entities and relationships to generate all the nodes for $e_j$ that have incoming links to them, as shown in line 15. It is possible that entities could have many different relationships with other entities. In this case, some relationships from the starting entity to the adjacent entities are kept. The combined result is a ConceptGraph where each node $e_i$ is connected to a set of edges and vertices (G,V) as $(\{e_i\},\{r_i\})$.

The fourth operation is to pass ConceptGraph nodes to the ConceptRank calculation algorithm. This is a modified Shimmy pattern-based algorithm that partitions a graph and iteratively calculates the ConceptRank of each node. The algorithm consists of 3 operations: the first ingests the graph on which to calculate ConceptRank, the second divides the graph into partitions, and the third iterates over partitions, calculating the ConceptRank of each node. The ConceptGraph is then passed into the ConceptSearch traversal algorithm with the corresponding nodes' ConceptRank values associated with the entity nodes through a join.

In some cases, the ConceptSearch algorithm is implemented in MapReduce using key-value pair based distribution. The first entity in each microblog text is considered a starting entity and all the following entities are assumed to have incoming links from a starting entity. ConceptSearch has two variations: (1) forward traversal: traversing the ConceptGraph by only following the outgoing edges forces traversal to proceed from the starting node of an adjacency list on to the secondary entities; and (2) forward and backward bi-directional traversal: traversing the ConceptGraph by following the outgoing and incoming edges allow traversal to be from any node of an adjacency list on to both the starting and secondary entities.

Figure 8:
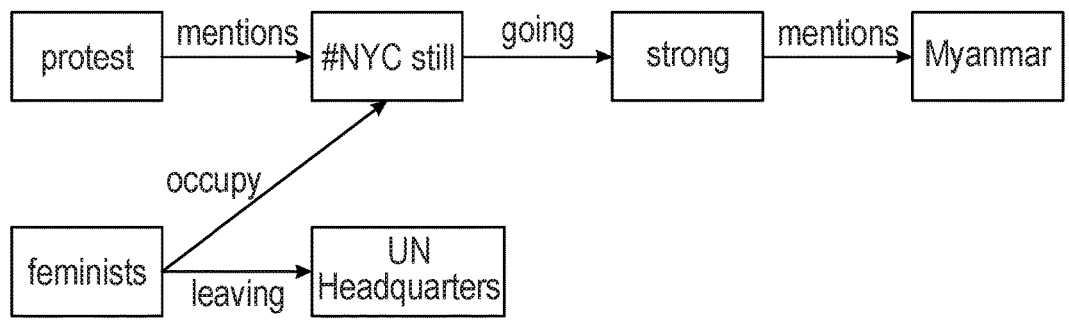
FIG. 8 is a flow diagram illustrating examples of storylines produced in conjunction with the subject technology.

FIG. 8 illustrates the two different types of storylines produced by bi-directional and forward only ConceptSearch. The figure shows two example storylines with starting entity 'protest', the first of which, protest→#NYC still→strong→Myanmar, gives a list of connected entities that appeared in tweets with the starting entity being 'protest', followed by '#NYC still'. In another post (e.g., tweet), the starting entity was '#NYC still' and the following entity 'strong', and in a third tweet the starting entity was 'strong' followed by 'Myanmar'. In the other storyline, however, 'feminist' can be any entity in the storyline provided it also included the term '#NYC still', and again 'UN Headquarters' can also be anywhere in the post (e.g., tweet) text as an entity along with 'feminists'.

---
Algorithm 2 Forward ConceptSearch
---

```
 1: MapReduce4
 2: Mapper4
       Input:<k₁; v₁>→<eᵢ,eⱼ;eₖ;eₗ...>// each graph node and its
       connected nodes
       distributed cache: → se₁, se₂, se₃..., seₙ
 3: for all seᵢ in se₁, se₂, se₃..., seₙ do
 4:    {for each starting entity}
 5:    if seⱼ == eᵢ then
 6:       {for each starting entity // match starting entity with key }
 7:       for all eₖ in v₁ do
 8:          match entity with any following entity for combinations
             Output:<k₁',v₁'>→ <seⱼ,{eₐ}>{eₐ is the list of all entities
             other than seⱼ}
 9:       end for
10:    end if
11: end for{initial extraction}
12: Reducer4 {combine elements from multiple nodes and emit a
    consolidated list per node}
       Input: <k₁',v₁'>→ <seⱼ,{eₐ}>
13: combine ConceptGraph entities eᵢ,eⱼ;eₖ;eₗ... and connected
    entities with starting entities seᵢ
       Output: <k₁',v₁'>→ <seⱼ,{eₖ}>{finish init loop}
14: for all i=1;i<k;i++ do
15:    //iterate for storylines of length k
16:    MapReduce5:
17:    Mapper5:
          Input:<k₁, v₁>→ <eᵢ,eⱼ;eₖ;eₗ...>
18:       prefix value with 'entities::'
19:       append '::' to key
          Output: <k₁',v₁'>→ <eᵢ ::,entities::{eᵢ; eⱼ,...}>
          <eⱼ ::,entities::{eᵢ;eⱼ,...}>
          ....
20:    Mapper5':
21:       prefix value with entities 'storylines'
          Input: <k₂; v₂>→ <eᵢ',sⱼ;sₖ;sₗ...>
          {sⱼ is a sub-story which is a combination of entities of format
          eⱼ :eₖ...}
          Output: <k₁',v₁'>→ <eᵢ',storylines::{sᵢ; sⱼ;...}>
          <eⱼ',storylines::{sᵢ; sⱼ;...}>
          ....
       {second loop} {The second job is called iteratively to aggregate
    incrementally storyline entities in the key.}
22:    Partitioner5:
          Input:<k₁, v₁>,numReduceTasks → <eᵢ[::],entities::|substories::eᵢ;
    eⱼ...|sⱼ; sⱼ...>
23:       extract entity from key
          Output:hashCode(eᵢ)%numReduceTasks
24:    Reducer5:
          Input:<k₁; v₁>→ <eᵢ[::],<eᵢ[::],entities::|substories::eᵢ;
    eⱼ...|sⱼ; sⱼ...>
          {second loop}
25:       for all i=1..n do
26:          if eᵢ == k₁ then
27:             second loop // match starting entity
28:             for all eₖ in k₁ or v₁ do
29:                emit extended storylines
                   Output:<k₁',v₁'>→ <sⱼ :eᵢ,{eₖ}>// pull in entities in the
                   value list
30:             end for
31:          end if
32:       end for
33: end for
```

In some cases, for large datasets, ConceptGraph might not be able to be held in memory on a single node and needs to be created and traversed on a cluster over a large number of nodes. In the distributed forward search described in Algorithm 2, the storylines can be generated by traversing the ConceptGraph by only following outgoing links. Here the starting entities are read into the distributed cache and the ConceptGraph, which is a set of nodes and its corresponding outgoing edges to connected nodes, is emitted from the mapper and checked to determine whether the starting entity is indeed the source node, as shown in line 6. If so, the storylines with each of the connected nodes are created. The next set of iterations then starts until the potential storylines list is created. The potential storyline list is then followed to the next level of corresponding entities for the nodes' storylines to a specified level. In MapReduce5 the partitioner in line 23 exploits the ordering of keys by MapReduce to prevent the buildup of all possible connected entities and sub-storylines in a reducer process. This traversal restricts storytelling creation to only storylines that have a first entity in a microblog text snippet as the starting entity selected by the user. This may be too restrictive for some domains but desirable in others.

Algorithm 3 traverses ConceptGraph bi-directionally to produce storylines as shown in FIG. 8. In a bi-directional ConceptSearch, the traversal of ConceptGraph at each iteration can begin from a starting node or a connected node, and the next connected node can be either a starting node or any node in its list of connected nodes. This invariably results in a much larger number of storylines. The ConceptSearch algorithm iteratively searches exhaustively for all entities and links by iterating over the ConceptGraph nodes. The algorithm starts by reading a set of starting points into the cache and then checking each starting node and connected nodes to see if any of the nodes match a starting entity, as shown in line 6. If so, it creates a list of partial storylines that in the next iteration are built to the next level by checking all the subsequent level nodes and the appearance of any of the last nodes in the starting or connected list. These operations can be performed iteratively by calling the same key-value pair based traversal for each operation of the storylines' extension.

---
Algorithm 3 Bi-directional ConceptSearch
---

```
 1: MapReduce4
 2: Mapper4
       Input: <k₁; v₁>→ <eᵢ,eⱼ;eₖ;eₗ...>// graph node and its connected nodes
       cache → se₁, se₂, se₃..., seₙ
 3: for all seᵢ in se₁, se₂, se₃..., seₙ do
 4:    {for each starting entity}
 5:    if seⱼ == eᵢ OR seⱼ in eⱼ,eₖ,eₗ then
 6:       {for each starting entity // match starting entity with any key or
    value entity of
          ConceptGraph node and connecting nodes}
 7:       for all eₖ in k₁ or v₁ do
 8:          // match entity with any entity for combinations
             Output: <k₁',v₁'>→ <seⱼ,{eₐ}>{eₐ is the list of all entities
             other than seⱼ}
 9:       end for
10:    end if
11: end for{initial extraction}
12: Reducer4 {combine elements from multiple nodes and emit a
    consolidated list per node}
       Input: <k₁',v₁'>→ <seⱼ,{eₐ}>
13: combine ConceptGraph entities eᵢ,eⱼ;eₖ;eₗ... and connected
    entities with starting entities seᵢ
       Output: <k₁',v₁'>→ <seⱼ,{eₖ}>{finish init loop}
14: for all i=1;i<k;i++ do
15:    //iterate for storylines of length k
16:    MapReduce5:
17:    Mapper5:
          Input:<k₁; v₁>→ <eᵢ,eⱼ;eₖ;eₗ...>
18:       prefix 'entities' to value
          Output: <k₁',v₁'>→ <eᵢ ::,entities::{eᵢ;eⱼ,...}>
          <eⱼ ::,entities::{eᵢ; eⱼ; ::}> ...
19:    Mapper5':
          Input: <k₂; v₂>→ <eᵢ',sⱼ;sₖ;sₗ...>{sⱼ is a sub-story which is
       a combination of entities of format eⱼ : eₖ::}
20:       Append '::' to entity in key and prefix value with 'substories::'
          Output: <k₁',v₁'>→ <eᵢ', substories::{sᵢ; sⱼ;...}>
          <eⱼ',substories::{sᵢ; sⱼ;...}>
          ...
       {second loop} {The second job is called iteratively to aggregate
    incrementally storyline entities in the key.}
```

```
Algorithm 3 Bi-directional ConceptSearch

21: Partitioner5:
       Input:<k₁; v₁>,numReduceTasks → <eᵢ[::],entities::eᵢ;
    eⱼ...|substories::|sⱼ; sⱼ...>
22:   extract entity from key
         Output:hashCode(eᵢ)%numReduceTasks
23: Reducer5:
       Input: <k₁; v₁>→ <eᵢ[::],entities::eᵢ; eⱼ...|substories::|sⱼ; sⱼ...>
       {second loop} {tertiary loop}
24:   for all i=1..n do
25:      if eᵢ in k₁ or in v₁ then
26:         second loop // match starting or any subsequent entity
27:         for all eₖ in k₁ or v₁ do
28:            emit extended storylines
                 Output: <k₁',v₁'>→ <sⱼ:eᵢ,{eₖ}>// pull in entities
                    in the value list
29:         end for
30:      end if
31:   end for
32: end for
```

In some implementations of distributed ConceptSearch, each iteration traverses all the nodes and starting entities in parallel. This facilitates traversing ConceptGraph and creating storylines for multiple starting points. As ConceptGraph is created first, during traversal multiple starting nodes or the last nodes of partial storylines can be considered for traversal to the next level as the incremental cost of additional starting points during each level of storyline building during a traversal iteration is small.

Figure 9:
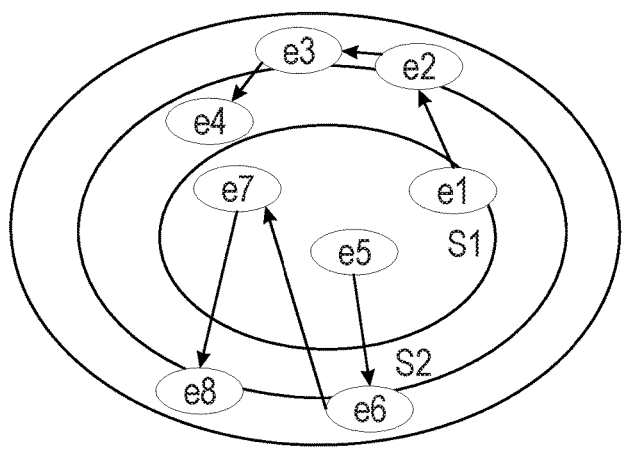
FIG. 9 is a schematic diagram illustrating an example geographic distribution of storylines.

FIG. 9 illustrates an example geographic distribution of storylines. In FIG. 9, the circles show the geographical region over which the entities are scattered. The entities e1, e2, e3, e4, e5, e6, e7, and e8 are associated with geographic locations of microblog or social network posts that were used to generate the storylines. Two storylines are depicted: S1, which includes e1-e2-e3-e4, and S2, which includes e5-e6-e7-e8. Looking at each pair of connected entities in the two storylines, storyline S1 has a total pairwise distance between entities that is less than that of storyline S2. S1's geographic footprint is thus smaller. This may make S1 more useful to analysts and may make it more likely that entities in S1 relate to the same things. For example, the storylines, "the blue car ran a red light," and "the police officer pulled over the blue car," are more likely to refer to the same "blue car" if the geographic footprint is smaller.

Aspects of the subject technology relate to a technique to focus specifically on storylines where the sum of pairwise distance between entities falls within a certain threshold. This enables the analyst to focus on storylines whose geographical footprint falls within that threshold. FIG. 9 shows the filtering of storylines by entity network distance threshold. This operation is key in limiting the number of storylines an analyst has to explore, allowing him or her to focus on entities in a particular geographic area. A spatial entity is one for which the location can be obtained, while temporal entities are associated with a timestamp. When neither location nor time is available, the entity is denoted as being purely textual.

The claim that space and time are important for storytelling led to investigation of the influence of spatio-temporal entities on storylines by calculating the distances between entities in terms of their spatial distances, assuming temporal ordering using Time Matrix in Santos. This spatial distance between entity pairs is used to filter storylines and thus enable analysts to focus on a certain segment of storylines. In some implementations, only storylines based on posts that were all made within 100 km of one another (e.g., have a geographic footprint of less than 100 km) are considered. An example of a storyline that meets this 100 km geographic footprint requirement and another that exceeds this requirement are shown below in Table 1. The storyline that exceeds the threshold has one of its entities 'la chine' in Nigeria, while the remaining entities are all in Ohio, USA. Entity network distance filtering thus makes it possible to identify and apply the best coordinates for an entity in a storyline. It utilizes an inverted value join where the elements of values of a key as storyline are emitted and then enriched and recombined to form the key. For example, the emitted storyline 'protest→america→the realm→la chine' as value for each of its entities; picking entity 'protest' emit 'protest::' as key and 'protest→america→the realm→la chine' as value; emit the locations of each of the entities as key such as 'protest' and value 'Location::41.4822:−81.6697' and ConceptRank of entities as key 'protest' and value 'ConceptRank::9.437'. This results in values combined in the reducer using lexical sorting of keys in MapReduce without aggregating all storylines for an entity in Reducer that can cause memory issues. The storylines are then emitted as keys along with the ConceptRank and location coordinates of each entity in subsequent MapReduce job as 'protest→america→the realm→la chine' and values 'protest;Location::41.4822: −81.6697;ConceptRank:: 9.437' for each of the entities to perform entity network distance-based filtering in the reducer. This is a classic example of multi-stage value preparation in order to consolidate all values needed to perform entity network distance geo-coordinate calculation on a single key value pair as one operation. The details of key-value pair based operations are shown in Algorithm 4.

TABLE 1

Storylines where one meets the user provided entity network distance threshold and one exceeds it.

| | Outside 100 km threshold | Within 100 km threshold |
|---|---|---|
| 1 | protest 41.4822:−81.6697 → america 41.4808:−81.8003 → the realm 41.3996:−81.6457→ la chine 51.89842:4.50328 | protest 41.4822:−81.6697 → america 41.4808:−81.8003 → selma protesters 41.3996:−81.6457 → the chants 41.4172:−81.6722 |

```
Algorithm 4 Inverted value join

1: MapReduce6:
2: Mapper6:
      Input:<k₁, v₁>→ <Sᵢ,e₁:r₁;e₂:r₂;....eₙ:rₙ>
3: emit each entity eᵢ with its corresponding storyline Sᵢ
      Output:<k₁', v₁'>→ <e₁,Sᵢ>
                         <e₂,Sᵢ>// emit each entity and storyline its in
                            separately
      ....
4: Reducer6: // remit all storylines for an entity
      Input:<k₁, v₁>→ <eᵢ,Sⱼ>
5: emit the storylines for each entity eᵢ with suffix
      Output: <k₁', v₁'>→ <eᵢ::,Sⱼ>
6: MapReduce7:
7: Mapper7: // join with pre-fetched coordinates as input
      Input1:<k₁, v₁>→ <eᵢ,coordᵢ>
8: emit the coordinates for each entity eᵢ with suffix
      Output:<k₁', v₁'>→ <eᵢ,Location::coordᵢ>
9: Mapper7': // emit each entity and its corresponding storylines as is
   from previous job
      Input2:<k₂, v₂>→ <eᵢ::,S₁>
                        <eⱼ::,;S₂;...>//emit the entities as is in with suffix
                        <eᵢ::,;Sₙ,>
```

-continued

Algorithm 4 Inverted value join

```
10: emit the storylines for each entity e_i with suffix
       Output: <k_1', v_1'>→ <e_i::,S_1>
                   <e_i::,S_2>// output each entity with suffix with
                   storyline
                   ....
                   <e_i,S_n>
11: Partitioner7:
       Input: <k_1, v_1>,numReduceTasks → <e_i[::],coord_i|S_i>
12: direct each entities location and storylines to same reducer // take
advantage of key sorting in MapReduce
       Output:hashCode(e_i)%numReduceTasks // ensures that coordinates
are ahead of entities and storylines in sorted
       key list and each entity key value pairs sent to same reducer
13: Reducer7:
       Input:<k_1, v_1>→ <e_i,S_1;S_2;...S_n>
       <k_1, v_1>→ <e_i::,coord_i>
14: combine location with storylines of keys as they come in order
location first with storylines following
       Output<k_1', v_1'>→ <S_1,e_i;coord_i>
                   <S_2,e_i;coord_i>//emit each storyline with its
constituent entity
                   and coordinate
                   ....
                   <S_n,e_i;coord_i>
15: MapReduce8:
16: Mapper8:
       Input:<k_1, v_1>→ <S_i,e_i;coord_j>
17: emit each storyline with entity and location
       Output:<k_1', v_1'>→ <S_i,e_i;coord_j>
18: Reducer8:
       Input:<k_1, v_1>→ <Si,e_j;coord_j;e_k;coord_k;e_l;coord_l...>
19: Combine entities and corresponding location of a storyline
20: Calculate distance //these are coordinate distances not euclidean and
21: if dist(e_j : e_k+e_k : e_l+...) <threshold then
22: compare with threshold //threshold is a parameter passed in provided
by user
       Output <k_1', v_1'>→ <S_i,e_j :coord_j;e_k;coord_k...>
23: emit only storylines within the threshold
24: end if
```

Mapper6 and Reducer6 in Algorithm 4 start with the input of a set of key-value pairs representing a storyline and its corresponding entities and relationships. Algorithm 4 then splits this storyline into a set of entity and storyline key-value pairs. Mapper7 combines an entity and its coordinate location into a key-value pair that can be combined with the entity and all the storylines it appears in to generate a list of storylines and the coordinates of each entity involved. Reducer7 then creates a key-value pair for each storyline in an entity value as key, along with the entity and coordinate location as value. Multiple key-value pairs with the same key as the storyline are then combined together to give the entire list of entities, along with their coordinate locations as value for a storyline key $S_i$. The final transform in Reducer8 generates a key-value pair with storyline $S_i$ as the key only if its sum of entity pair distances, entitydist, is below a certain threshold. The sequence in MapReduce7 and MapReduce8 in Algorithm 4 illustrates the inverted value join operation in MapReduce that is utilized to perform entity network distance-based filtering. MapReduce implementation of the storyline network distance computation specifies several joins to perform the network distance-based storyline culling. With each entity's details, a large number of keys are emitted during the generation of entities within the storylines. These keys are essential to fully parallelize the pairwise network distance computation, and are used to land all the requisite entities and their locations as values for a storyline key in a reducer after multiple MapReduce jobs. In order to emit each set of entities for the storylines in a large dataset containing millions of entities and storylines, the number of pairs of entities and storylines will be enormous, creating a significant performance bottleneck. However, since entities are often repeated, according to some implementations, the inverted value join limits the number of keys as entities.

To alleviate the problem of a key with too many values when entities are emitted with all storylines they are a part of, some aspects of the subject technology utilize the natural sorting of keys provided in MapReduce. Constructs available in the MapReduce paradigm allow us to exploit the natural ranking of elements and order within the entities and storylines data to limit our key-value pair emissions and reduce the number of jobs by eliminating those purely used for sorting. Since the keys are sorted based on text fields in default ascending lexical order, it is useful to leverage that order to give keys with storylines a lower sort order and those with location a higher sort order so that they can be re-emitted as values for keys as storylines and thus join the values as entities, along with their ConceptRank and locations. A custom partitioner ensures the keys for an entity go to a particular reducer; for example <e1, Location:lat;lon> will appear earlier in the sorted key list than $<e_1::, S_1; \ldots>$ . . . which can then be exploited to associate the location of $e_1$ in emission in Reducer6 in line 5. This prevents having to store the storylines in memory until the location value is received, which could cause memory errors. Section 5 shows empirically that this network path-based storyline pair culling gives good results, limiting the number of storyline pairs calculated, improving the quality and reducing the quantity of storylines to be reviewed by an analyst.

In sequential processing the computation complexity of entity extraction for social network or microblog (e.g., Twitter®) data is O(T) where T is the number of posts (e.g., tweets); performance of storylines construction is O(N); the order of ConceptRank computations begins O(N), where N is the social network size. The complexity of building storylines based on ConceptRank is O(N) or the number of nodes in ConceptGraph. In a distributed environment, the order of extracting entities is O(T/k), where k is the number of distributed processes, and the order of building storylines by distance computations is O(N/k); the order for performing distributed ConceptRank is O(log N/ε), where (1−ε) is the dampening factor, and the order for building storylines based on distributed iterative storyline generation is O(N/k). These orderings clearly show the scalability of distribution as the processing can be rapidly scaled simply by adding nodes, with each node running multiple mappers and reducers. For forward versus bi-directional ConceptSearch computations, complexity is the same even though vastly different numbers of storylines are generated in bi-directional ConceptSearch. For multiple starting points, the set of starting entities is greater than one, yet the order of traversal is still O(N/k), as each new starting point does not increase the number of passes made through ConceptGraph data.

The space complexity of the distribution techniques is O(E), where E is the maximum number of entities to which a ConceptGraph node has outgoing connections. This is a vast improvement over sequential implementation's space complexity, which is O(N). The constrained size of data structures on each process also avoids memory issues. MapReduce allows for iterating over all the connected nodes of a ConceptGraph node without storing them in memory, which suffices for operations such as entity network distance filtering. Given the high memory usage needed in sequential processing, even if nodes in structures for ConceptGraph include reading in from disk as needed, the paging rate increases, further deteriorating performance. For multiple starting points, memory usage stays constrained to O(E). In some algorithms there is need to combine all storylines that contain an entity, such as in inverted value join which is of order O(N), which can cause memory errors. Thus, some aspects of the subject technology include keeping space complexity in a process to E that is of lower order than N, and iterating over the connected nodes instead of storing them in a process memory. With the astute use of partitioners, in some aspects, the memory footprint in each reducer for inverted value join is kept to order O(E) for storylines filtering. The memory footprint of ConceptSearch iterations is also kept as O(E), which allows node level operations on ConceptGraph to be performed, in some aspects, in a single reducer in ConceptSearch.

In summary, some aspects of the subject technology propose a technique for exploring interactions from spatio-temporal dynamic real-world storylines generated from microblog and event data sources, performed at scale using a distributed computing paradigm. One approach distributes multiple step storytelling that includes entity extraction, geo-coding, ConceptGraph creation and traversal for storyline generation and the entity network distance-based filtering of storylines. Techniques such as ConceptSearch are applied to perform graph traversal operations at scale, and inverted value join allows disparate sets of values to be combined together efficiently in the key-value pair paradigm. With the use of this distributed approach, analysis is no longer limited to a relatively small number of entities and storylines generated from raw social network or microblog (e.g., Twitter®) data in sequential storytelling. Examples of storylines generated in this study demonstrate the high potential for exploratory analysis using current events such as the New York City protests, the Ferguson protests, and the Charlie Hebdo attacks. The insights to be gained from the results generated by this distributed approach are different from the limited insights provided from the smaller output of other sequential approaches.

Figure 10:
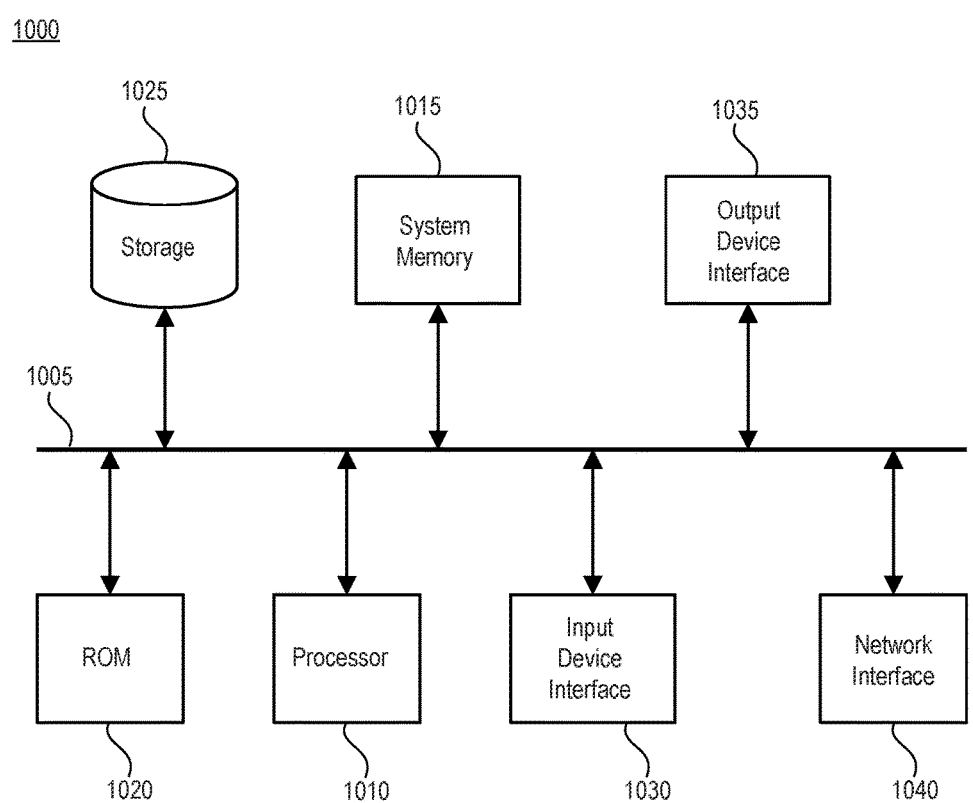
FIG. 10 is a block diagram illustrating an example electronic system with which some implementations of the subject technology can be implemented.

FIG. 10 conceptually illustrates an electronic system 1000 with which some implementations of the subject technology are implemented. For example, one or more of the client device 110, the server 120, or the data repository 130 may be implemented using the arrangement of the electronic system 1000. The electronic system 1000 can be a computer (e.g., a mobile phone, PDA), or any other sort of electronic device. Such an electronic system 1000 includes various types of computer-readable media and interfaces for various other types of computer-readable media. Electronic system 1000 includes a bus 1005, processor(s) 1010, a system memory 1015, a read-only memory 1020, a permanent storage device 1025, an input device interface 1030, an output device interface 1035, and a network interface 1040.

The bus 1005 collectively represents all system, peripheral, and chipset buses that communicatively connect the numerous internal devices of the electronic system 1000. For instance, the bus 1005 communicatively connects the processor(s) 1010 with the read-only memory 1020, the system memory 1015, and the permanent storage device 1025.

From these various memory units, the processor(s) 1010 retrieves instructions to execute and data to process in order to execute the processes of the subject technology. The processor(s) 1010 can include a single processor or a multi-core processor in different implementations.

The read-only-memory (ROM) 1020 stores static data and instructions that are needed by the processor(s) 1010 and other modules of the electronic system 1000. The permanent storage device 1025, on the other hand, is a read-and-write memory device. This device is a non-volatile memory unit that stores instructions and data even when the electronic system 1000 is off. Some implementations of the subject technology use a mass-storage device (for example a magnetic or optical disk and its corresponding disk drive) as the permanent storage device 1025.

Other implementations use a removable storage device (for example a floppy disk, flash drive, and its corresponding disk drive) as the permanent storage device 1025. Like the permanent storage device 1025, the system memory 1015 is a read-and-write memory device. However, unlike storage device 1025, the system memory 1015 is a volatile read-and-write memory, such a random access memory. The system memory 1015 stores some of the instructions and data that the processor(s) 1010 needs at runtime. In some implementations, the processes of the subject technology are stored in the system memory 1015, the permanent storage device 1025, or the read-only memory 1020. For example, the various memory units include instructions for distributed storytelling and intelligence analysis in accordance with some implementations. From these various memory units, the processor(s) 1010 retrieves instructions to execute and data to process in order to execute the processes of some implementations.

The bus 1005 also connects to the input and output device interfaces 1030 and 1035. The input device interface 1030 enables the user to communicate information and select commands to the electronic system 1000. Input devices used with input device interface 1030 include, for example, alphanumeric keyboards and pointing devices (also called "cursor control devices"). Output device interface 1035 enables, for example, the display of images generated by the electronic system 1000. Output devices used with output device interface 1035 include, for example, printers and display devices, for example cathode ray tubes (CRT) or liquid crystal displays (LCD). Some implementations include devices, for example a touch screen, that function as both input and output devices.

Finally, as shown in FIG. 10, bus 1005 also couples electronic system 1000 to a network (not shown) through a network interface 1040. In this manner, the electronic system 1000 can be a part of a network of computers (for example a local area network (LAN), a wide area network (WAN), or an Intranet, or a network of networks, for example the Internet). Any or all components of electronic system 1000 can be used in conjunction with the subject technology.

The above-described features and applications can be implemented as software processes that are specified as a set of instructions recorded on a computer-readable storage medium (also referred to as computer-readable medium). When these instructions are executed by one or more processor(s) (which may include, for example, one or more processors, cores of processors, or other processing units), they cause the processor(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor (e.g., processor(s) 1010). Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems (e.g., the electronic system 1000), define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra-density optical discs, any other optical or magnetic media, and floppy disks. The computer-readable media can store a computer program that is executable by at least one processor and includes sets of instructions for performing various operations. Examples of computer programs or computer code include machine code, for example as produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms "display" or "displaying" mean displaying on an electronic device. As used in this specification and any claims of this application, the terms "computer-readable medium" and "computer-readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of operations in the processes disclosed is an illustration of example approaches. Based upon design preferences, it is understood that the specific order or hierarchy of operations in the processes may be rearranged, or that all illustrated operations be performed. Some of the operations may be performed simultaneously. For example, in certain circumstances, multitasking and parallel processing may be implemented. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, "an aspect," does not imply that the aspect is essential to the subject technology or that the aspect applies to all configurations of the subject technology. A disclosure relating to an aspect may apply to all configurations, or one or more configurations. A phrase, for example, "an aspect," may refer to one or more aspects and vice versa. A phrase, for example, "a configuration," does not imply that such configuration is essential to the subject technology or that such configuration applies to all configurations of the subject technology. A disclosure relating to a configuration may apply to all configurations, or one or more configurations. A phrase, for example, "a configuration," may refer to one or more configurations and vice versa.

Throughout this specification, plural instances may implement components, operations, or structures described as a single instance. Although individual operations of one or more methods are illustrated and described as separate operations, one or more of the individual operations may be performed concurrently, and the operations may be performed in any order, not necessarily the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

In this document, the terms "a" or "an" are used, as is common in patent documents, to include one or more than one, independent of any other instances or usages of "at least one" or "one or more." In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," and so forth are used merely as labels, and are not intended to impose numerical requirements on their objects.

What is claimed is:

1. A method comprising:
receiving, at a memory of a server computer system executing a distributed storytelling framework, a set of publicly accessible social network posts from one or more social networking systems, each publicly accessible social network post including text comprising at least nouns and verbs and including a geographic location associated with the social networking post;
converting, by one or more processors of the server computer system, the set of publicly accessible social network posts into a plurality of adjacency lists, each adjacency list comprising a set of nodes linked together by a set of edges, wherein converting the set of publicly accessible social network posts into the plurality of adjacency lists comprises: performing natural language processing by the one or more processors on social network posts to extract entities corresponding to nouns and verbs that link two or more nouns from text of each post in the set of publicly accessible social network posts, and assigning each extracted entity to serve as a key or a value based on a verb linking two or more nouns in at least one adjacency list, the key and the value being nouns extracted from text of a social network post and verbs connecting the two or more nouns and partial storylines generated from those nouns and verbs;
receiving a user query, by the one or more processors of the server computer system, wherein the user query comprises at least a starting entity and a storyline length of k nodes specified by a user in a user interface of a client device, wherein k is an integer greater than two;
converting, by the one or more processors of the server computer system in response to the starting entity of the user query, an adjacency list from the plurality of adjacency lists to a set of generated storylines having a length of two or ore nodes, each storyline being represented in the memory as a key-value pair, wherein the key-value pair represents a node and one or more partial storylines comprising the node linked to other nodes by edges;

combining, by the one or more processors of the server computer system, storylines, of the set of generated storylines, to generate an extended storyline in response to a value from a first storyline matching an entity from an adjacency list, wherein the extended storyline has a length of greater than two nodes, includes a single key and multiple values, and is added to the set of generated storylines;

repeating, by the one or more processors of the server computer system, combining storylines, of the set of generated storylines, with co-occurring entities in values of adjacency lists, to generate extended storylines, at least one of the generated extended storylines having the length of k nodes specified in the user query;

generating, by the one or more processors of the server computer system, an output comprising at least one output storyline corresponding to at least one of the generated extended storylines having the length of k nodes that starts from the starting entity; and communicating, with a network interface of the server computer system, the output as a digital transmission to the client device for display of the at least one output storyline to the user in response to the user query at the client device.

2. The method of claim 1, wherein a key-value pair of the first storyline is N1:N2, wherein a value in an adjacency list is N2:N3, and where the extended storyline from the first storyline and a co-occurring entity in values of the adjacency list is N1:N2:N3, wherein N1 is a first node, N2 is a second node, and N3 is a third node.

3. The method of claim 1, further comprising:
determining that the starting entity corresponds to a node in the adjacency list, wherein providing the output corresponding to the at least one of the generated storylines comprises providing an output of at least one storyline that includes the co-occurring node in the adjacency list.

4. The method of claim 1, wherein extending the storylines to generate extended storylines in response to the value from the first storyline matching a value in an adjacency list comprises:
determining that a timestamp of the co-occurring entity in value of adjacency list corresponds to a time later than a timestamp of the first storyline; and
extending the first storyline with the co-occurring entity in the adjacency list in response to determining that the timestamp of the entity in extended storyline corresponds to the time later than the timestamp of the preceding entities in storyline.

5. The method of claim 1, further comprising:
combining each node from at least a portion of the set of nodes with a concept rank, the concept rank measuring an importance of a corresponding node based on links to the corresponding node,
wherein providing the output corresponding to at least one of the generated storylines comprises providing the output corresponding to a generated storyline enhanced with concept ranks of nodes in the generated storyline for subsequent sorting.

6. The method of claim 1, further comprising:
combining each node from at least a portion of the set of nodes with a geographic location,
wherein combining the generated storylines to generate additional storylines in response to the value from a first storyline to be combined matching the key from a second storyline to be combined further comprises: combining the generated storylines to generate additional storylines based on a geographic distance between a geographic location of a node in the first storyline and a geographic location of a node in the second storyline being less than a threshold geographic distance.

7. A non-transitory machine-readable medium comprising instructions which, when executed by one or more processors of a server computer system, cause the server computer system to execute a distributed storytelling framework by performing operations comprising:

receiving, at a memory associated with the one or more processors of the server computer system, a set of publicly accessible social network posts, each publicly accessible social network post including text comprising at least nouns and verbs and including a geographic location associated with the social networking post;

converting, by the one or more processors of the server computer system, the set of publicly accessible social network posts into a plurality of adjacency lists, each adjacency list comprising a set of nodes linked together by a set of edges, wherein converting the set of publicly accessible social network posts into the plurality of adjacency lists comprises: performing natural language processing by the one or more processors on social network posts to extract entities corresponding to nouns and verbs that link two or more nouns from text of each post in the set of publicly accessible social network posts, and assigning each extracted entity to serve as a key or a value based on a verb linking two or more nouns in at least one adjacency list, the key and the value being nouns extracted from text of a social network post and verbs connecting the two or more nouns and partial storylines generated from those nouns and verbs;

receiving a user query, by the one or more processors of the server computer system, wherein the user query comprises at least a starting entity and a storyline length of k nodes specified by a user in a user interface of a client device, wherein k is an integer greater than two;

converting, by the one or more processors of the server computer system in response to the starting entity of the user query, an adjacency list from the plurality of adjacency lists to a set of generated storylines having a length of two or more nodes, each storyline being represented in the memory as a key-value pair, wherein the key-value pair represents a node and one or more partial more storylines comprising the node linked to other nodes by edges;

combining, by the one or more processors of the server computer system, storylines, of the set of generated storylines, to generate an extended storyline in response to a value from a first storyline matching an entity from an adjacency list, wherein the extended storyline has a length of greater than two nodes, includes a single key and multiple values, and is added to the set of generated storylines;

repeating, by the one or more processors of the server computer system, combining storylines, of the set of generated storylines, with co-occurring entities in values of adjacency lists, to generate extended storylines, at least one of the generated extended storylines having the length of k nodes specified in the user query;

generating, by the one or more processors of the server computer system, an output comprising at least one output storyline corresponding to at least one of the generated extended storylines having the length of k nodes that starts from the starting entity; and communicating, with a network interface of the server computer system, the output as a digital transmission to a client device for display of the at least one output storyline to the user in response to the user query at the client device.

8. The machine-readable medium of claim 7, wherein a key-value pair of the first storyline is N1:N2, wherein a value in an adjacency list is N2:N3, and where the extended storyline from the first storyline and a co-occurring entity in values of the adjacency list is N1:N2:N3, wherein Ni is a first node, N2 is a second node, and N3 is a third node.

9. The machine-readable medium of claim 7, the operations further comprising:
determining that the starting entity corresponds to a node in the adjacency list,
wherein providing the output corresponding to the at least one of the generated storylines comprises providing an output of at least one storyline that includes the co-occurring node in the adjacency list.

10. The machine-readable medium of claim 7, wherein extending the storylines to generate extended storylines in response to the value from the first storyline matching a value in an adjacency list further comprises:
determining that a timestamp of the co-occurring entity in value of adjacency list corresponds to a time later than a timestamp of the first storyline; and
extending the first storyline with the co-occurring entity in the adjacency list in response to determining that the timestamp of the entity in extended storyline corresponds to the time later than the timestamp of the preceding entities in storyline.

11. The machine-readable medium of claim 7, the operations further comprising:
combining each node from at least a portion of the set of nodes with a concept rank, the concept rank measuring an importance of a corresponding node based on links to the corresponding node,
wherein providing the output corresponding to at least one of the generated storylines comprises providing the output corresponding to a generated storyline enhanced with concept ranks of nodes in the generated storyline for subsequent sorting.

12. The machine-readable medium of claim 7, the operations further comprising:
combining each node from at least a portion of the set of nodes with a geographic location,
wherein combining the generated storylines to generate additional storylines in response to the value from a first storyline to be combined matching the key from a second storyline to be combined further comprises: combining the generated storylines to generate additional storylines based on a geographic distance between a geographic location of a node in the first storyline and a geographic location of a node in the second storyline being less than a threshold geographic distance.

13. A server computer system comprising:
one or more processors; and
a memory comprising instructions which, when executed by the one or more processors, cause the one or more processors to execute a distributed storytelling framework by performing operations comprising:

receiving a set of publicly accessible social network posts, each publicly accessible social network post including text comprising at least nouns and verbs and including a geographic location associated with the social networking post;

converting, by the one or more processors of the server computer system, the set of publicly accessible social network posts into a plurality of adjacency lists, each adjacency list comprising a set of nodes linked together by a set of edges, wherein converting the set of publicly accessible social network posts into the plurality of adjacency lists comprises: performing natural language processing by the one or more processors on social network posts to extract entities corresponding to nouns and verbs that link two or more nouns from text of each post in the set of publicly accessible social network posts, and assigning each extracted entity to serve as a key or a value based on a verb linking two or more nouns in at least one adjacency list, the key and the value being nouns extracted from text of a social network post and verbs connecting the two or more nouns and partial storylines generated from those nouns and verbs;

receiving a user query, by the one or more processors of the server computer system, wherein the user query comprises at least a starting entity and a storyline length of k nodes specified by a user in a user interface of a client device, wherein k is an integer greater than two;

converting, by the one or more processors of the server computer system in response to the starting entity of the user query, an adjacency list from the plurality of adjacency lists to a set of generated storylines having a length of two or more nodes, each storyline being represented in the memory as a key-value pair, wherein the key-value pair represents a node and one or more partial storylines comprising the node linked to other nodes by edges;

combining, by the one or more processors of the server computer system, storylines, of the set of generated storylines, to generate an extended storyline in response to a value from a first storyline matching an entity from an adjacency list, wherein the extended storyline has a length of greater than two nodes, includes a single key and multiple values, and is added to the set of generated storylines;

repeating, by the one or more processors of the server computer system, combining storylines, of the set of generated storylines, with co-occurring entities in values of adjacency lists, to generate extended storylines, at least one of the generated extended storylines having the length of k nodes specified in the user query;

generating, by the one or more processors of the server computer system, an output comprising at least one output storyline corresponding to at least one of the generated extended storylines having the length of k nodes that starts from the starting entity; and communicating, with a network interface of the server computer system, the output as a digital transmission to a client device for display of the at least one output storyline to the user in response to the user query at the client device.

14. The system of claim 13, wherein a key-value pair of the first storyline is N1:N2, wherein a value in an adjacency list is N2:N3, and where the extended storyline from the first storyline and a co-occurring entity in values of the adjacency list is N1:N2:N3, wherein N1 is a first node, N2 is a second node, and N3 is a third node.

15. The system of claim 13, the operations further comprising:
   determining that the starting entity corresponds to a node in the adjacency list,
   wherein providing the output corresponding to the at least one of the generated storylines
   comprises providing an output of at least one storyline that includes the co-occurring node in the adjacency list.

16. The system of claim 13, wherein the operations for extending the storylines to generate extended storylines in response to the value from the first storyline matching a value in an adjacency list further comprise:
   determining that a timestamp of the co-occurring entity in value of adjacency list corresponds to a time later than a timestamp of the first storyline; and
   extending the first storyline with the co-occurring entity in the adjacency list in response to determining that the timestamp of the entity in extended storyline corresponds to the time later than the timestamp of the preceding entities in storyline.

17. The system of claim 13, the operations further comprising:
   combining each node from at least a portion of the set of nodes with a concept rank, the concept rank measuring an importance of a corresponding node based on links to the corresponding node,
   wherein providing the output corresponding to at least one of the generated storylines comprises providing the output corresponding to a generated storyline enhanced with concept ranks of nodes in the generated storyline for subsequent sorting.

* * * * *